United States Patent

[11] 3,582,771

| [72] | Inventor | Eugene A. Placke<br>Houston, Tex. |
|---|---|---|
| [21] | Appl. No. | 806,758 |
| [22] | Filed | Sept. 11, 1968 |
| [45] | Patented | June 1, 1971 |
| [73] | Assignee | A.M.F. Incorporated<br>New York, N.Y.<br>Continuation-in-part of application Ser. No.<br>504,567, Oct. 24, 1965, now abandoned. |

[54] MOVABLE INSPECTION DEVICE WITH FLUID PRESSURE OPERATED RETRACTORS MOUNTED ON A ROTATING MEMBER
9 Claims, 19 Drawing Figs.

[52] U.S. Cl. ............................................. 324/37, 73/71.5
[51] Int. Cl. ........................................... G01r 33/12
[50] Field of Search ........................... 324/34, 37, 40; 73/71.5

[56] References Cited
UNITED STATES PATENTS

| 2,250,460 | 7/1941 | Barnes et al. | 324/37 |
| 2,719,953 | 10/1955 | Waldie | 324/37 |
| 2,878,447 | 3/1959 | Price et al. | 324/37 |
| 3,202,914 | 8/1965 | Deem et al. | 324/37 |
| 3,244,972 | 4/1966 | Fisher | 324/37 |
| 3,271,664 | 9/1966 | Mountz et al. | 324/40 |
| 3,311,819 | 3/1967 | Miller | 324/37 |
| 3,345,563 | 10/1967 | Wood | 324/37 |
| 3,346,807 | 10/1967 | Wood et al. | 324/37 |
| 3,299,350 | 1/1967 | Tompkins et al. | 324/37 |

FOREIGN PATENTS

| 196,150 | 7/1957 | Austria | 324/37 |

Primary Examiner—Rudolph V. Rolinec
Assistant Examiner—R. T. Corcoran
Attorneys—George W. Price and John H. Gallagher ABSTRACT: This application discloses apparatus for inspecting pipe or like tubular articles, particularly magnetic flux leakage-type inspection of ferromagnetic pipe. The pipe is moved axially through rotating inspection apparatus which includes a magnetizer having diametrically opposed pole pieces to produce rotating circumferential flux. Shoe assemblies bearing upon the pipe contain transducers responsive to flux leakage caused by flaws in the pipe, a fluid-powered arrangement being disclosed for suspending the shoes to provide retracted or engaged positions. For the fluid-powered shoe suspension assembly, unique drive mechanisms and lubricating techniques are shown. In one embodiment, the magnetizer pole pieces are adjustable to accommodate pipe of varying sizes.

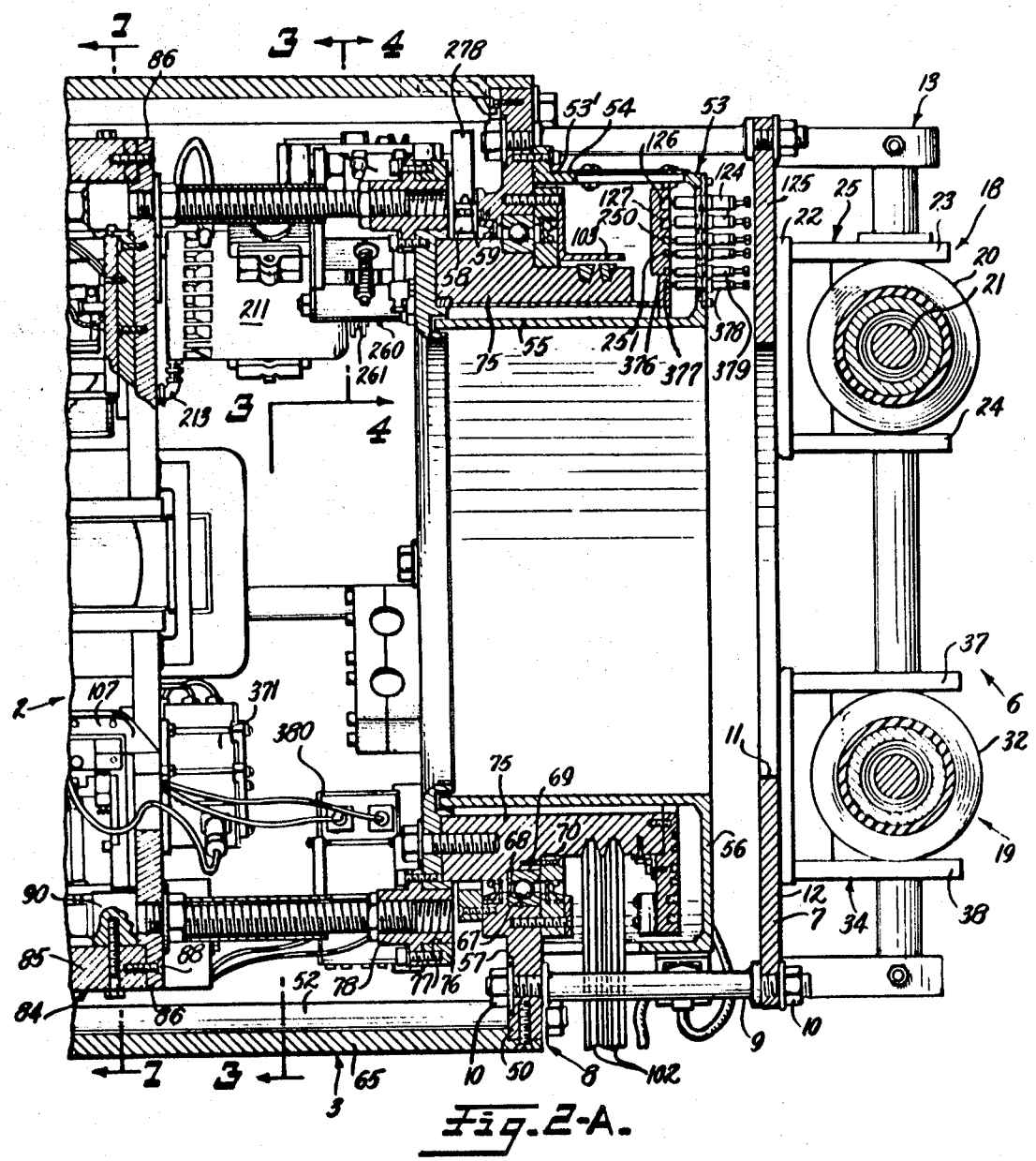
Fig.2-A.

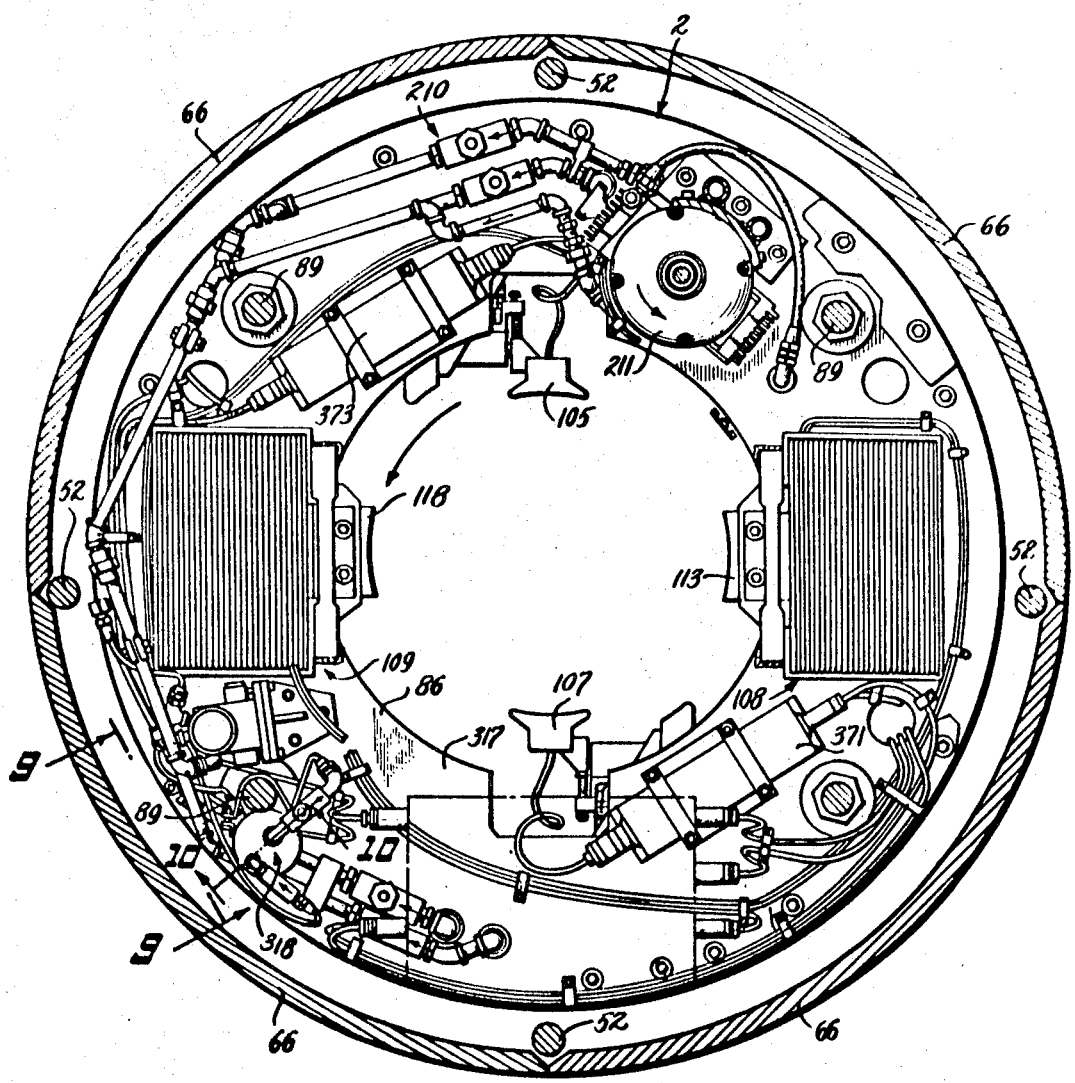

INVENTOR
EUGENE A. PLACKE

BY Arnold & Roylance
ATTORNEYS

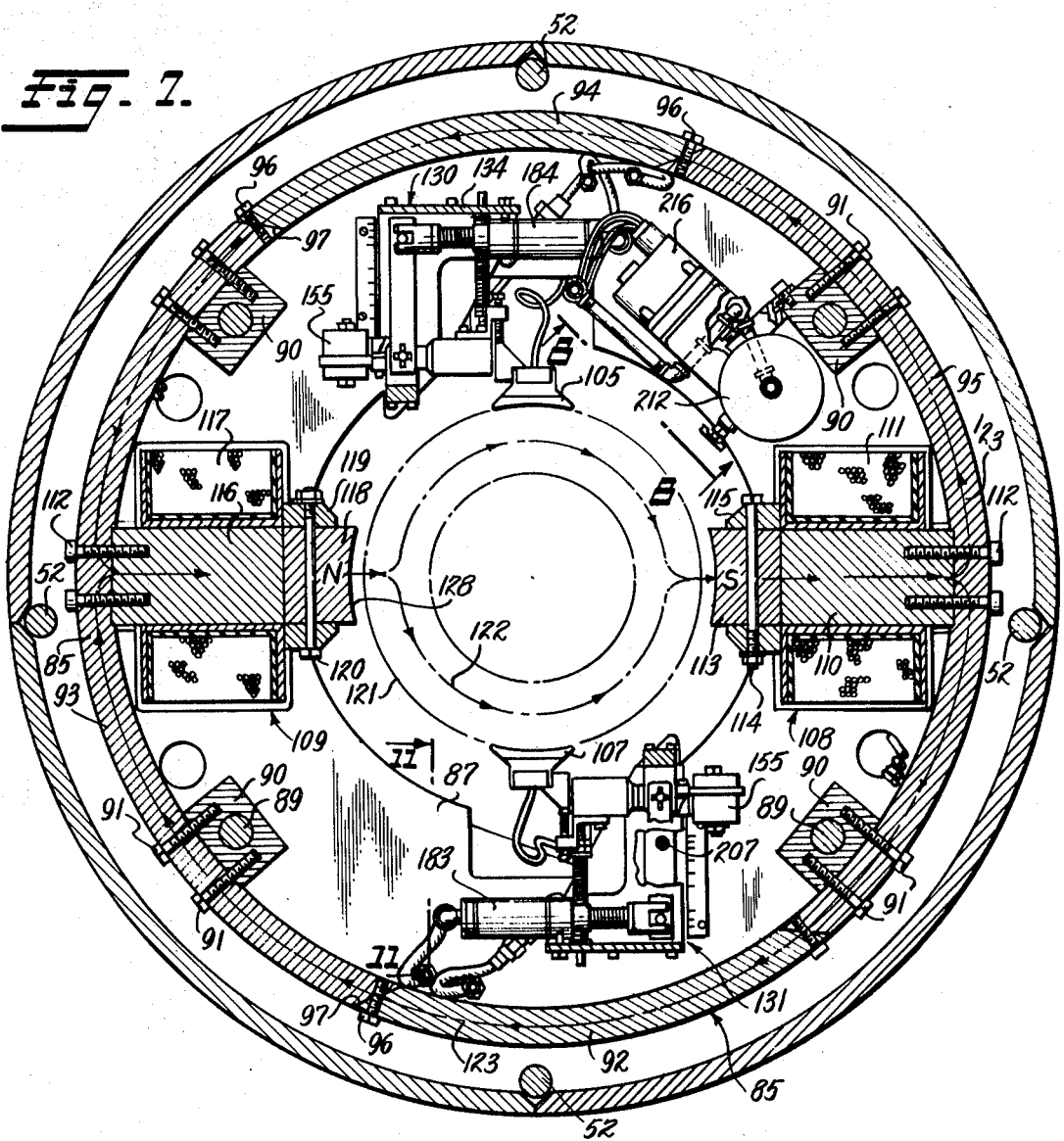
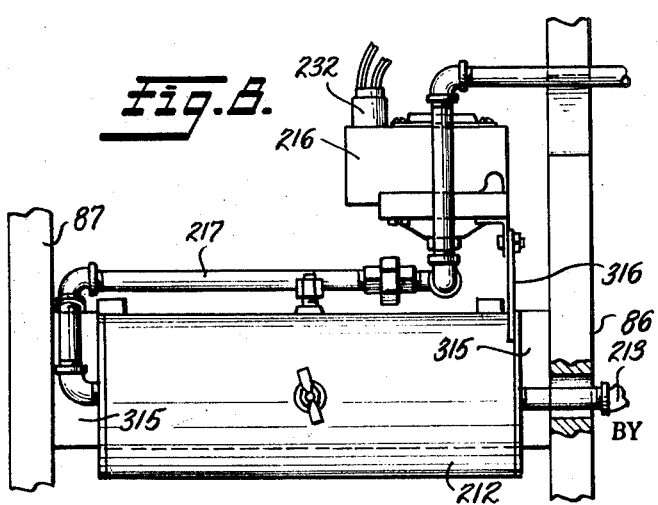
INVENTOR
EUGENE A. PLACKE
Arnold & Roylance
ATTORNEYS

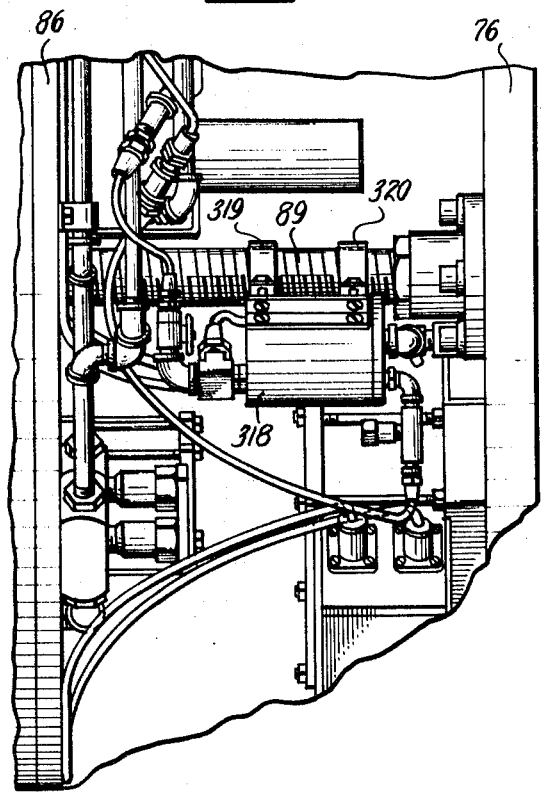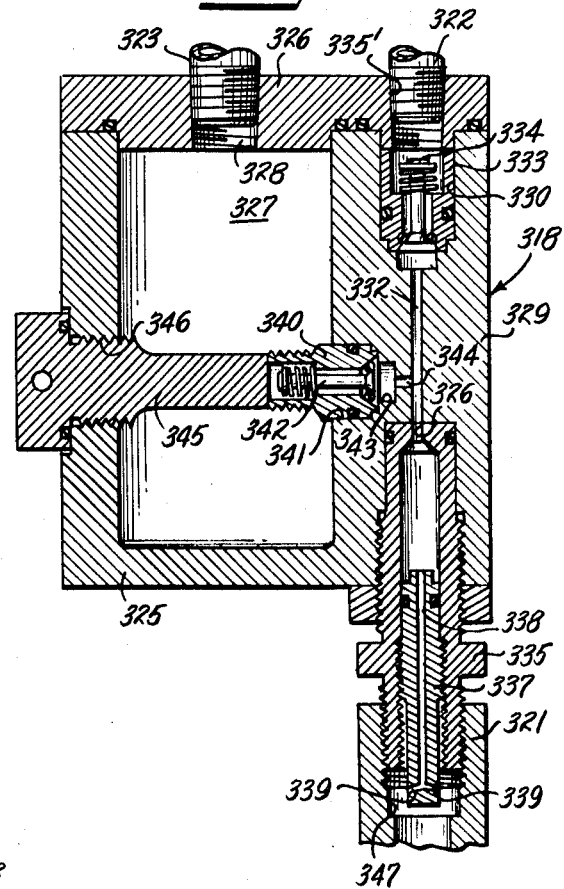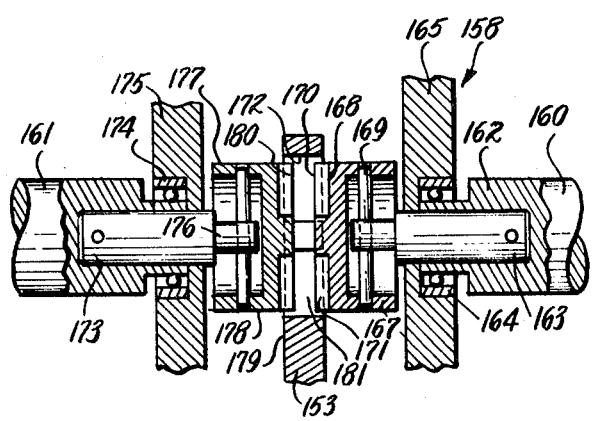

PATENTED JUN 1 1971 3,582,771

INVENTOR
EUGENE A. PLACKE

BY Arnold & Raylance
ATTORNEYS

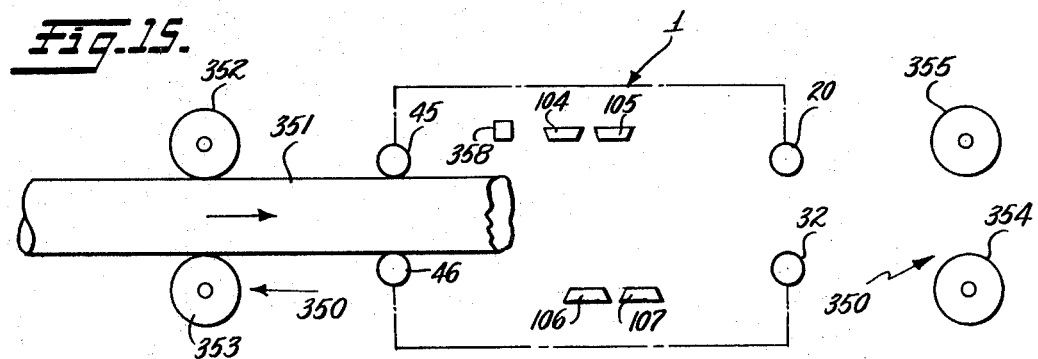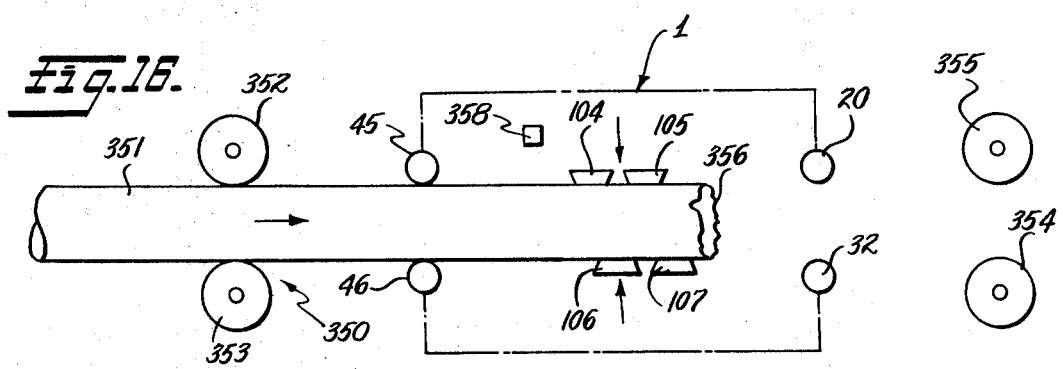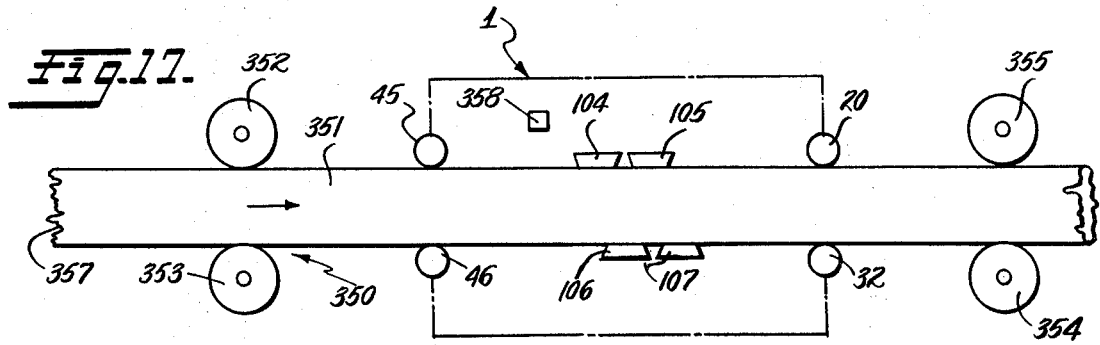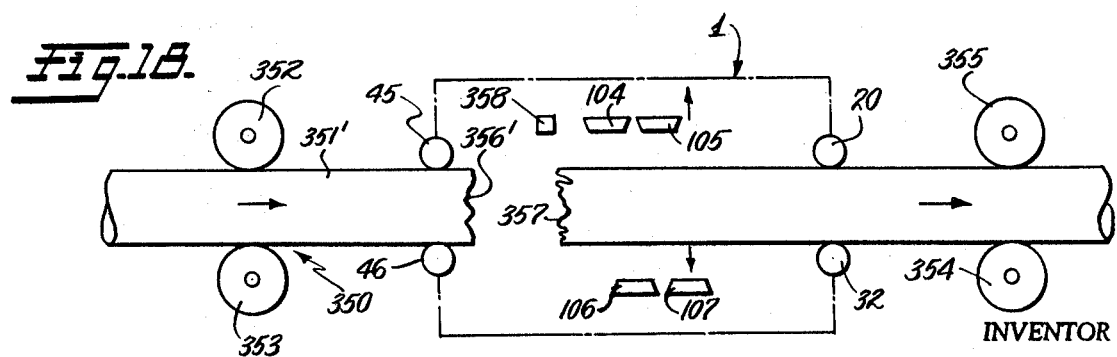

MOVABLE INSPECTION DEVICE WITH FLUID PRESSURE OPERATED RETRACTORS MOUNTED ON A ROTATING MEMBER

This application is a continuation-in-part of copending application Ser. No. 504,567, filed Oct. 24, 1965 now abandoned and assigned to the assignee of the present invention.

In the manufacture of drill pipe or the like, the joints of pipe are preferably inspected just after forming in rough billets, prior to finishing steps. In billet form, the pipe sections often have rough ends, usually belled out, although these ends are cropped off at a later manufacturing stage. The rough ends hamper the inspection operation due to possible damage to the scanning shoes which are used to detect flaws.

Pipe inspection is to be accomplished by moving the pipe axially through a rotating inspection device which contains a magnetizer to produce circumferential magnetic flux in the pipe, and flaws are detected by search coils in shoes mounted on the rotor. The movement of the pipe should not be stopped as it would disrupt the flow of pipe through the mill, and the detector shoes must be retracted to clear the rough ends of the pipe joints while still scanning almost the entire length of the pipe joint. The power operated mechanisms for extending and retracting the shoes must operate rapidly and positively, and since these devices rotate with the inspection assembly, it is preferable that weight is a minimum and a simple, rugged construction is provided.

In the preferred embodiment of the invention, described herein in detail, the rotating inspection apparatus finds particular utility in the high speed inspecting of tubular goods, such as steel pipe, after the pipe is formed in a steel mill. In these preferred embodiments, the inspection apparatus takes the form of a rotor through which the rough formed pipe billet is rapidly conveyed and the pipe billet is inspected for defects and imperfections by an inspecting device which rotates with the rotor. Thus, the inspection apparatus is preferably mounted in the conveyor line of a steel mill along which rough billet pipe is conveyed from the piercing station to the first machining operation. It is important that the pipe be tested in its rough billet form so that defective pipe can be immediately rejected before additional operations are performed on the pipe.

Immediately after piercing, the pipe billet is of a very rough, uneven character. During forming of the pipe billet, the billet is heated and is pierced in this heated condition. As a result of such piercing, the ends of the pipe are quite rough and uneven and sometimes have relatively large, sharp edges which project radially or axially from adjacent ends of a length of billet pipe. However, the surface of the pipe beginning at perhaps a few inches from each end of the pipe is relatively smooth and provides a substantially constant diameter cylindrical surface. Rough billet pipe can be rapidly tested with inspection apparatus having delicate search shoes by conveying the pipe through the inspection apparatus at a rapid rate while maintaining the search shoes in a retracted position spaced from the pipe during the time the leading or trailing ends of the pipe billet pass between the search shoes, and by extending the search shoes to a position closely adjacent or engaging the relatively smooth surface of the pipe billet between the portions of the ends where ragged projections frequently are found. Hence, the search shoes are operated to engage the pipe after the first several inches of the leading end of the pipe or article has passed between the search shoes. The search shoes then remain adjacent the surface of the pipe until just before the trailing end of the pipe passes between the shoes, whereupon the shoes are lifted to avoid damage to the shoes by the trailing end of the pipe. The preferred inspection apparatus is in the form of an apparatus for ferromagnetic inspection for flaws and imperfections, the apparatus including a rotor on which the inspection shoes are mounted so that the inspection shoes traverse a helical path around a pipe as it is moved axially through the apparatus.

Since the inspection shoes must be closely adjacent the peripheral surface of the pipe during testing to obtain accurate results, the mounting arrangement for the inspection shoes is quite critical. In accordance with one important feature of this invention, the inspection shoes are provided with unique mounting arrangements which assure accurate and uniform test results and also provide for retracting and extending the search shoes in proper timed relation with the travel of a pipe billet through the inspection apparatus. In addition, the shoes are retracted and extended by a power operated device which in accordance with one embodiment of this invention is a fluid operated cylinder of the pneumatic-type which receives pressure fluid for its operation from a pressure source in the form of an air compressor mounted on the rotor for rotation therewith and which is driven in response to rotation of the rotor. This arrangement wherein the air compressor is mounted on the rotor avoids the need for special piping and seals normally required to transmit fluid under pressure to a rotating member.

In addition, the inspection apparatus is adjustable to test various sizes of pipe and other articles up to perhaps 24 inches or greater in diameter. Therefore, the opening in the rotor through which the pipe is passed during testing must be at least as great as the largest diameter of pipe to be tested. Correspondingly, the search shoes are mounted on adjustable supporting brackets which permit adjusting the shoes radially of the axis of the rotor to accommodate large diameter pipe. Also, according to an important feature of the invention, the pole pieces for the magnetizer in the rotor are adjustable to position the pole tips closely adjacent, but not engaging, the pipe.

The variation in pipe diameter requires that all equipment mounted on the rotor be located beyond the periphery of the largest diameter pipe to be tested. Correspondingly, the use of rotating seals to transmit pressure fluid to the rotating inspection device is substantially prohibited because the seals must have a larger diameter than the largest pipe to be tested, and such large diameter seals are desirable because of the high centrifugal forces encountered during rotation of the rotor. It is for this reason that the compressor is located on the rotor and is mechanically driven thereby.

Since uniformity of test data is important to simplify analysis of test results, the speed of rotation of the rotor is varied for different diameter pipe to maintain the linear surface speed of the test shoes essentially constant. Usually a value of from perhaps 250 up to 600 ft. per minute is selected as the nominal surface speed, although for large diameter pipes speeds of up to 1200 ft. per minute or more may be used. The speed of the rotor must be reduced when larger diameter pipe is tested, to maintain a constant surface speed. Since the air compressor of the embodiment using fluid-operated shoe suspension is driven by a stationary drive ring relative to which the rotor rotates, the speed of the compressor should also be varied and this is accomplished by a unique speed change belt arrangement which varies the speed of the compressor to obtain optimum operating characteristics for any speed of the rotor. Due to such operation at different speeds, the centrifugal forces within the rotor vary with a change in diameter of pipe billet under test. Such varying centrifugal forces present substantial problems of lubrication of the compressor which are avoided by employing a compressor of the "oil-less"type which may be of the diaphragm-type or have graphite lubricated pistons. However, when an oil-less compressor is used, the valves and other portions of the pressure system do not obtain the lubrication normally obtained with an oil lubricated compressor.

Therefore, lubrication of the various moving elements of the pressure system is provided for by a unique lubrication with lubricant metering apparatus which wholly avoids centrifugal force problems and provides adequate lubrication via the pneumatic piping of the inspection apparatus. As will later be discussed in detail, the lubricating apparatus includes an oil reservoir and a unique atomizer to motor oil into the piping of the pneumatic system.

Another significant feature of the inspection apparatus of this invention is its fail-safe operation. In order to prevent damage to the delicate shoes of the inspection apparatus, in the event of a pressure leak in the pressure system which extends and retracts the shoes and also in the event of outside electric power failure, the shoes and their associated mounting and operating apparatus, are so arranged that the shoes automatically retract in response to either loss of pressure of the pressure system of the inspection apparatus or outside power failure. Fail-safe operation is provided in the solenoid-operated arrangement due to the spring bias of the solenoid.

Features which are believed characteristic of the invention are set forth in the appended claims. The invention itself, however, as well as other features and advantages thereof, may best be understood by reference to the following detailed description of particular embodiments, when read in conjunction with the accompanying drawings, wherein:

FIG. 1 is an end elevational view of the pipe inspection apparatus according to one embodiment of the invention, as viewed from the pipe outlet end of the apparatus;

FIGS. 2 and 2-A form a sectional view of the inspection apparatus of the embodiment of FIG. 1, taken along lines 2-2 of FIG. 1;

FIG. 3 is a view in section taken along lines 3-3 of FIG. 2-A;

FIG. 7 is a view in section taken along lines 7-7 of FIG. 2-A;

FIG. 8 is an enlarged view taken along lines 8-8 of FIG. 7;

FIG. 9 is a partial view in section taken along lines 9-9 of FIG. 3;

FIG. 10 is a sectional view on an enlarged scale of the lubrication metering device which may be used in one embodiment of this invention, with the section taken along lines 10-10 of FIG. 3;

FIG. 13 is a sectional view on an enlarged scale taken along lines 13-13 of FIG. 12;

FIG. 15 is a schematic illustration of the inspection apparatus of one embodiment of the invention showing its operation in a steel pipe mill;

FIG. 16 is a schematic illustration as in FIG. 15, at another point in the operating cycle;

FIG. 17 is a schematic illustration as in FIG. 15 at still another stage of operation;

FIG. 18 is a schematic illustration as in FIG. 15 at a different operating stage;

Figure 1:
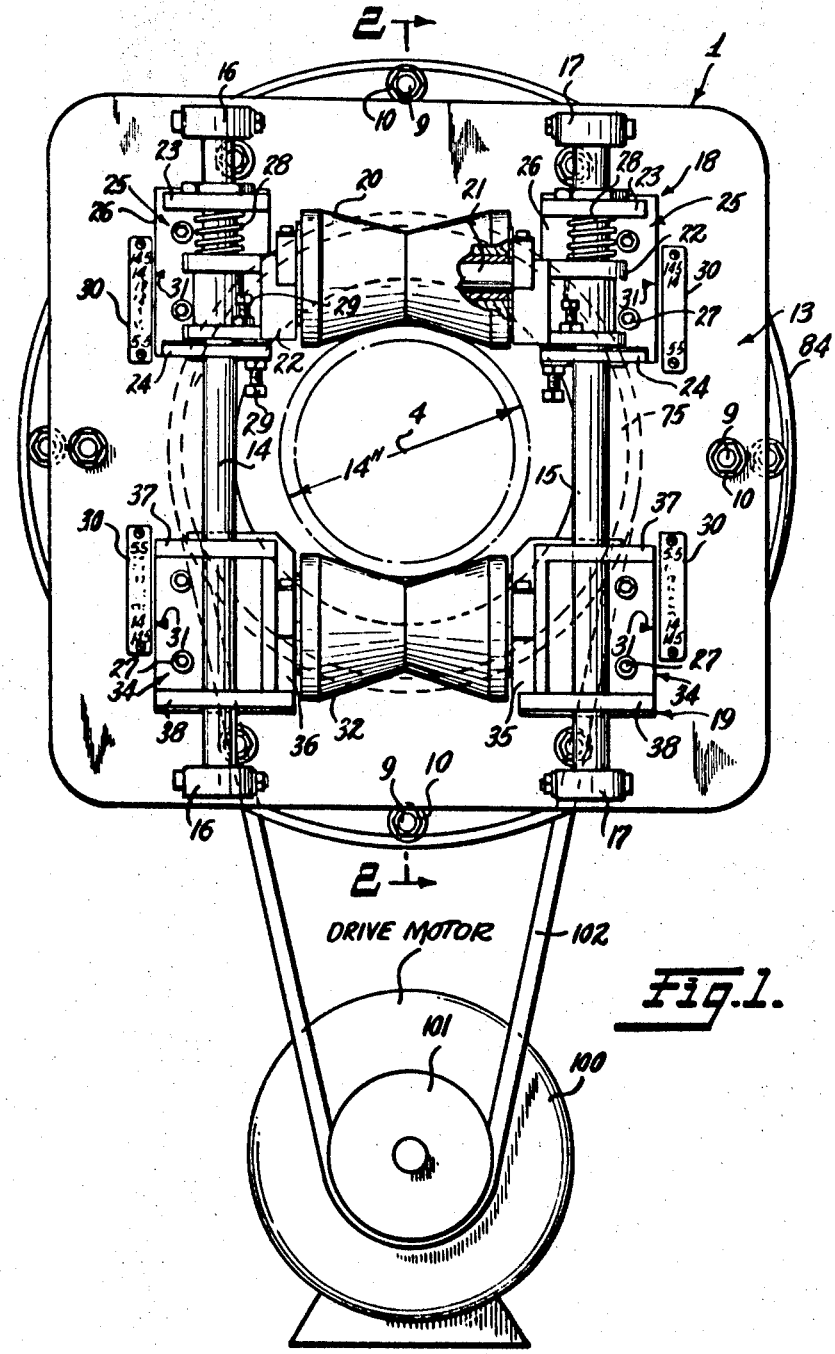
Figure 2:
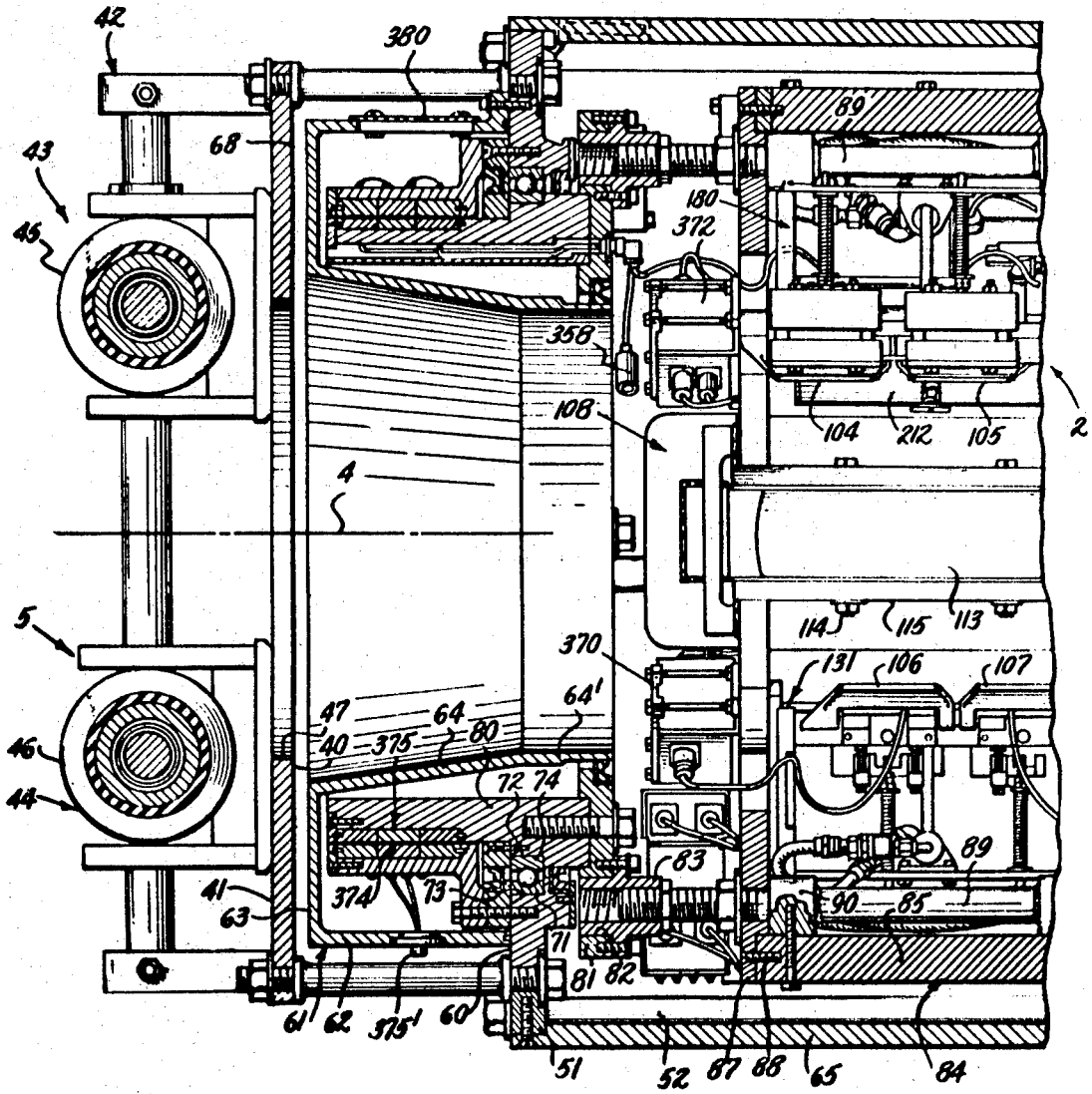

Referring now to the drawings in detail and particularly to FIGS. 1, 2, and 2-A, inspection apparatus 1 is comprised of a rotor assembly 2 and a frame or support 3 in which the rotor assembly is mounted. Support 3 is fastened to a supporting base (not shown) to fix support 3 against movement. Support 3 mounts rotor assembly 2 for rotation about an axis 4.

Support 3 takes the form of a housing which completely encloses rotor assembly 2 except at inlet end 5 and outlet end 6 of the support.

Outlet end 6 of the support includes an end plate 7 secured to the main or body portion 8 of the support by six axially extending support bars 9 having threaded ends and transverse shoulders spaced from the ends to secure the end plate in spaced relation from body portion 8 of the support. As shown at FIG. 2-A, nuts 10 are threaded onto the ends of support bars 9 to fasten the end plate so it extends perpendicular to axis 4, the opening having a diameter larger than the largest pipe to be tested by inspection apparatus 1.

Mounted on outer face 12 of end plate 7 is a guide assembly 13 which guides a pipe into inspection apparatus 1 so that the pipe is concentric with axis 4 of rotor assembly 2.

Guide assembly 13 includes a pair of parallel spaced-apart bars 14 and 15 which are parallel with face 12 of end plate 7 and extend generally vertically. The upper and lower ends of bar 14 are bolted to arms 16 which are fixed to end plate 7 by welding and project axially from the end plate. Bar 15 is similarly bolted to arms 17 welded to the end plate. Bars 14 and 15 provide a support to adjustably mount upper and lower pipe guide roller assemblies 18 and 19.

Upper guide assembly 18 includes an upper guide roller 20 having conical guide surfaces which slope toward its transverse center, the roller freely rotating on bearings provided between the guide roller and its supporting shaft 21. Support brackets 22 at each side of the upper guide roller 20 are fixed to the opposite ends of shaft 21 to provide a carriage which slides vertically on bars 14 and 15. Each of support brackets 22 has an opening therein to be slidably mounted on one of bars 14 and 15. Each support bracket is mounted between a pair of spaced-apart, parallel, horizontal plate portions 23 and 24 of a support structure 25. Support structures 25 are also mounted for sliding movement on bars 14 and 15, respectively. Each support structure has a vertical plate portion 26 which engages outer surface 12 of end plate 7. Support structure 25 is secured against vertical movement for a particular position of upper guide assembly 18 by screws 27 which pass through plate 26 and are received by threaded openings in end plate 7. End plate 7 and vertical plate 26 are provided with a predetermined pattern of openings (not shown) to receive screws 27 to permit coarse adjustment of the elevation of upper guide assembly 18 relative to axis 4 of the rotor so the upper guide assembly may be used to guide pipe of any predetermined diameter within the pipe diameter test range of inspection apparatus 1. Support brackets 22 are urged against horizontal plate 24 of each support structure by helically wound compression springs 28 between the upper end of each support bracket 22 and the lower face of plate 23. To permit fine adjustment of upper guide roller 20 relative to the axis 4 of the rotor, adjusting screws 29 with suitable lock arrangements are provided to vary the space between the lower face of support bracket 22 and the upper face of plate 24 of support structure 25. Also mounted on end plate 7 are indicator plates 30 which may be aligned with indicator arrows 31 on each support structure 25 to set roller 20 to guide a pipe of a predetermined diameter.

Lower guide assembly 19 includes a lower guide roller 32 identical to upper guide roller 20 and which has the ends of its shaft fixed to lower support structures 34. The lower support structures have vertical plates 35 and 36, perpendicular to plate 7, and in which the ends of the shaft of lower guide roller 32 are fixed. Lower support structures 34 also have horizontal plate portions 37 and 38 with a vertical opening therein to be slidably mounted on the respective ones of bars 14 and 15. The mounting arrangement for lower support structures 34 is the same as for upper support structures 25 and includes screws 27 by which lower support structures 34 are fixed to plate 7. Suitable indicia plates 30 and indicator arrows 31 are also provided for lower guide assembly 19 to indicate the proper position of the lower guide roller 32 for a particular diameter of pipe. As shown at indicia plates 30 of FIG. 1, the rollers 20 and 32 are adjusted to guide a 14 inch diameter pipe through inspection apparatus 1. The nip (distance between surfaces of the rollers) of the rollers is adjusted to be slightly less than the diameter of pipe to be tested so that roller 20 will be urged against the pipe by the action of compression springs 28.

Inlet end 5 of support 3 is substantially the same as outlet end 6 of the support. The inlet end includes an end plate 40 fixed to the body assembly 8 of the support with support bars 9 and secured thereto with nuts 10 threaded onto the ends of the bars. Mounted on outer surface 41 of end plate 40 is a guide assembly 42 with an upper roller guide assembly 43 identically to roller guide assembly 18, previously described. In addition, there is a lower roller guide assembly 44 mounted on outer surface 41 of end plate 40 and is identical to roller guide assembly 19 previously described for outlet end 6, of support 3. (Upper and lower guide assemblies 43 and 44, respectively, are not shown in side elevation.) An upper roller 45 and a lower roller 46 are provided respectively in upper and lower guide assemblies 43 and 44, at the inlet end of inspection apparatus 1. An opening 47 in end plate 40 is larger than the largest diameter pipe to be tested by inspection apparatus 1.

The body portion 8 of support 3 includes a pair of thick support rings 50 (FIG. 2-A) and 51 (FIG. 2) maintained in spaced-apart, parallel relation by four elongated spacer bars 52 which are bolted to the support rings.

Secured to a flat outer side surface 53' (FIG. 2-A) of support ring 51 is an outlet end shield 53 which has cylindrical outer sleeve portion 54, a smaller diameter cylindrical inner sleeve portion 55 and a radially extending connecting plate portion 54 which integrally connects the inner sleeve portion to the outer sleeve portion. Fixed to inner side 57 of support ring 50 is a stationary drive ring 58 with a smooth cylindrical surface 59 concentric with axis 4 of the rotor.

Fixed to an outwardly facing side 60 of support ring 51 (FIG. 2) is an inlet end shield 61 having an outer cylindrical sleeve portion 62, a radially inwardly projecting plate portion 63 and an integral inner sleeve portion 64 which converges in a direction toward outlet end 6 and terminates at a cylindrical sleeve portion 64'.

Extending between support rings 50 and 51 and fixed thereto with suitable screws is a cover shell 65 (FIGS. 2 and 2-A) comprised of four mating sections 66 (FIG. 3), each of which spans 90° of the circumference of the shell. The shell 65 is also concentric with axis 4.

MOunted in an inner cylindrical surface 67 of support ring 50 and fixed thereto is a stationary race 68 of a ball bearing assembly 69. Ball bearing assembly 69 has a rotatable race 70. Similarly, support ring 51 (FIG. 2) has a stationary race 71 of a bearing assembly 72 mounted in its inner cylindrical surface 73. A rotatable race 74 is supported for rotation by stationary race 71.

Mounted for rotation on bearing assemblies 69 and 72 is rotor assembly 2 of inspection apparatus 1. At the end of rotor assembly 2 adjacent outlet end 6 is a heavy rotatable support ring 75 to which rotatable race 70 of bearing assembly 69 is secured. Support ring 75 provides support for the rotor assembly adjacent outlet end 6 of the inspection apparatus. Support ring 75 rotates concentric with axis 4 of the rotor. Secured to support ring 75 is an annular support plate 76 which also rotates about axis 4. Support plate 76 is provided with axially extending bores 77 spaced slightly from its peripheral edge and in which threaded bushings 78 extend, bushings 78 being fixed to support plate 76.

At its other end, rotor assembly 2 has a rotatable support ring 80 fixed to the rotatable race 74 of bearing assembly 72 so that support ring 80 is mounted for rotation about axis 4. Fixed to support ring 80 is an annular support plate 81 having openings 82 to receive internally threaded bushings 83 which are fixed to the support plate. An inspection equipment housing 84 of rotor assembly 2 is located between support plates 76 and 81. Housing 84 includes a thick cylindrical shell 85 of ferromagnetic material with end plates 86 and 87 fixed to opposite ends of the shell with threaded connectors such as screws 88. Housing 84 of rotor assembly 2 is fixed to support plates 76 and 81 with four circumferentially spaced connector bars 89 having threaded ends which are received in respective ones of bushings 78 and 83. The connector bars extend through mounting blocks 90 of which there are eight, four adjacent each side of rotor shell 85. As shown at FIGS. 2, 2-A, and 7, connector blocks 90 engage the inner peripheral surface of rotor shell 85 and are secured to the shell with bolts 91 that extend through the shell so that connector bars 89 provide additional support for housing portion 84.

With reference to FIG. 7, it can be seen that rotor shell 85 is comprised of four arcuate sections 92—95, which are connected together to form cylindrical shell 85. These arcuate sections are connected together with bolts 96 passing through the portions of the sections adjacent the angled edges 97. Sections 93 and 95 have a greater circumferential length than sections 92 and 94. Also, connector blocks 90 are fixed only to sections 93 and 95. This permits sections 92 and 94 to be removed by removing bolts 96 to permit access to the inspection equipment mounted within housing 84. Observe from FIG. 7 that sections 92 and 94 can be lifted away from sections 93 and 95 after bolts 96 are removed.

In view of the foregoing, it is apparent that rotor assembly 2 includes an inspection equipment housing mounted for rotation on bearings adjacent each end of the rotor assembly so that the rotor may be rotated relative to support 3. The rotor is rotated by a variable speed motor 100 (FIG. 1) having a drive pulley 101 about which drive belts 102 extend. Belts 102 drive support ring 75 via pulley grooves 103 (FIG. 2-A) of the support ring, to drive rotor assembly 4 when motor 100 is turned on.

Mounted within the housing 84 of rotor assembly 2 are search shoes 104—107 (FIG. 2), to inspect pipe passed axially through the rotor, and electromagnets 108 and 109 (FIG. 7) which circumferentially magnetize the pipe being tested.

Electromagnet 108 includes a ferromagnetic core 110 and an energizing winding 111 wound around the ferromagnetic core. The radially outer end of core 110 engages the inner surface of shell 85 and is secured to the shell with suitable bolts 112. Core 110 has a removable pole piece 113 which is secured to electromagnet 108 by bolts 114 which extend through a frame portion 115 of electromagnet, the frame portion being secured to each of end plates 86 and 87 (FIGS. 2 and 2-A). As will be observed with reference to FIGS. 2 and 2-A, electromagnet 108 is substantially elongated in a direction parallel with axis 4, so that the electromagnet extends beyond end plates 86 and 87 of housing 84 of the rotor, but with pole piece 113 terminating at about the planes of the end plates.

Electromagnet 109 is of the same construction as electromagnet 108 and includes a core 116 having a winding 117, the core being fixed to shell 85 with bolts 112 and a removable pole piece 118 secured to frame 119 with bolts 120. It is to be observed with reference to FIG. 7 that core 110 and pole piece 113 of electromagnet 108 are mounted on shell 85 at a position diametrically opposite core 116 and pole piece 118 of electromagnet 109.

Electromagnets 108 and 109 are energized with direct current. Winding 111 of electromagnet 108 is so wound and is so connected to a direct current source that a magnetic south pole is present at the tip of pole piece 113. Winding 117 is so wound and its direct current source so connected that tip 118 of electromagnet 109 has a magnetic north pole. The action of electromagnets 108 and 109 is to magnetize pipe 121 (shown in phantom lines) circumferentially as shown by the flux path of lines 122. The magnetic circuit of the pipe magnetizing electromagnets includes rotor shell 85 which, as previously mentioned, is made of ferromagnetic material. Thus, there is a magnetic flux path from electromagnet 108 which passes circumferentially through shell 85 as shown by flux lines 123. The direct current to energize electromagnets 108 and 109 is supplied by brushes 124 and 125 (FIG. 2-A) which engage annular slip rings 126 and 127 of rotor assembly 2 via suitable connecting wires (not shown) from a direct current source external of the inspection apparatus.

Pole pieces 113 and 118 are bolted respectively to frames 115 and 119 so that these pole pieces are removable. This permits using pole pieces of different lengths and of different curvature at the inner face 128 of each pole piece when pipes of different diameter are tested by the inspection apparatus. Hence, if a pipe having a diameter substantially smaller than that of pipe 121 of FIG. 7 is to be tested, pole pieces 113 and 118 would be removed and be replaced with other pole pieces which are substantially longer and which have pole surfaces which curve concentrically about the pipe to be tested.

Figure 11:
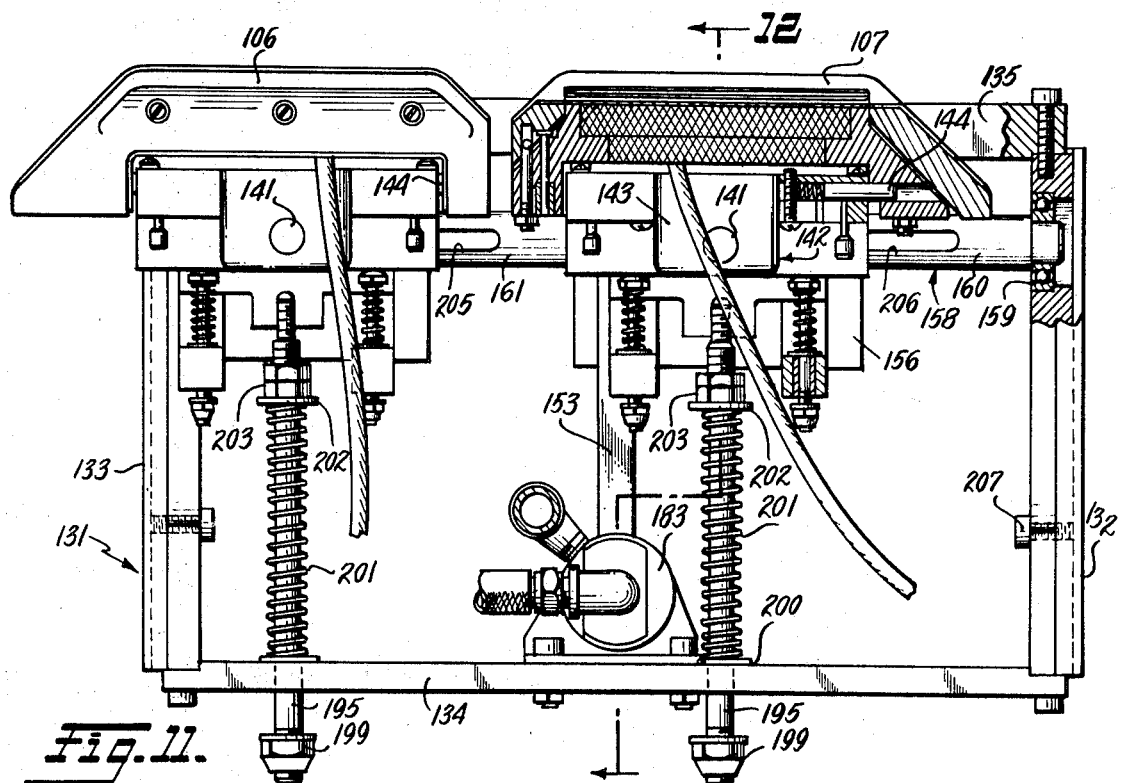
FIG. 11 is a partial view with portions thereof removed for clarity of the inspection shoe mounting arrangement of one embodiment of the invention, taken along lines 11-11 of FIG. 7.
Figure 12:
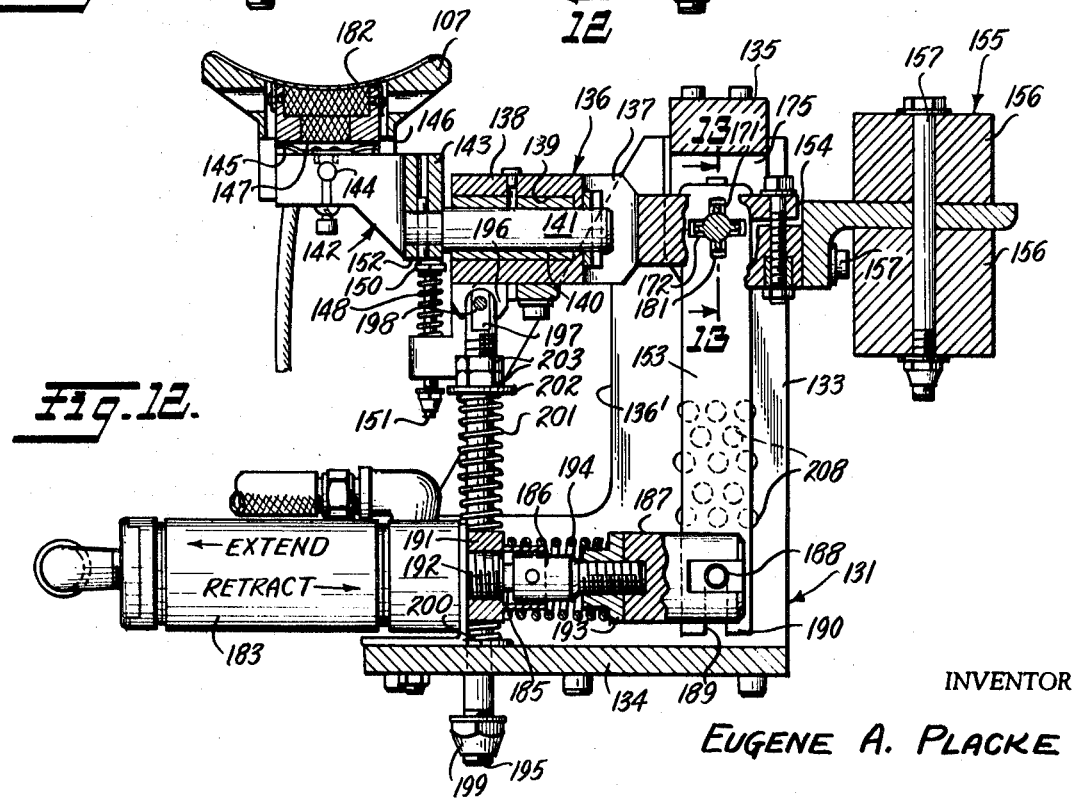
FIG. 12 is a sectional view taken along lines 12-12 of FIG. 11.

As previously mentioned, search shoes 104—107 are also mounted within housing 84 of rotor assembly 2. As shown in FIG. 2, search shoes 104 and 105 are mounted on a shoe assembly supporting bracket 130 and shoes 106 and 107 are mounted on a shoe assembly supporting bracket 131. FIGS. 11—13 show the mounting arrangement for shoes 106 and 107 on an enlarged scale. With reference to FIGS. 11—13, it will be noted that supporting bracket 131 includes a pair of parallel side plates 132 and 133 fixed to the opposite ends of a connecting plate 134. Extending across and fixed to the opposite ends of plates 132 and 133 is a reinforcing bar 135. The reinforcing bar 135 connected to the opposite ends of plates 132 and 133 is generally parallel with connecting plate 134 so that shoe support bracket 131 takes the form of a generally box-shaped bracket as viewed at FIG. 11. Each of side plates 132 and 133 is generally trapezoidally shaped and has a recess 136' formed in the inner face thereof to provided clearance for pivotal movement of shoes 106 and 107 between their retracted and extended positions as will subsequently be described in detail.

As shown at FIG. 12, shoe 107 is mounted on a pivot arm assembly 136. The pivot arm assembly includes a pivot arm 137 with an enlarged head 138 having a cylindrical bore 139 therein which extends generally longitudinally of arm 137. A bearing 140 is fitted into bore 139. Extending through bearing 140 is a shaft 141 fixed to a second pivot assembly 142, the shaft being mounted for rotation relative to the bearing. Shaft 141 is fixed to an elongated mounting head 143. Pivotally mounted on mounting head 143 with pins 144 is search shoe 107. Observe that the mounting arrangement is such that search shoe 107 can oscillate about the axis of pins 144 and can also oscillate about the axis of bearing 140. Oscillation of shoe 107 about the axis of pin 144 is restrained by a leaf spring 145 between surface 146 of head 143 and surface 147 of shoe 107. Oscillation of shoe 107 about the axis of bearing 140 and shaft 141 is restrained by springs 148 which urge dome-shaped heads 150 of screws 151 against surface 152 of head 143, the screws 151 being located on opposite sides of the axis of shaft 141 to normally maintain shoe 107 in a substantially neutral position. Each of search shoes 104—106 is similarly mounted on its own pivot arm assembly 136 and second pivot assembly 142 in the same manner as described for shoe 107. By virtue of this floating mounting arrangement for each of shoes 104-—107, the shoes ride on the surface of a pipe conveyed through the inspection apparatus and precisely follow the surface of the pipe. The mounting arrangement including pivot arm assembly 136 and second pivot assembly 142 is essentially the same as the "Magnetic Inspection Search Shoe Mount Providing Movement about Multiple Orthogonal Axes" of U.S. Pat. No. 3,170,114 issued Feb. 16, 1965 and by Eugene A. Placke, and reference is made thereto for a complete description of the details of the pivotal mounting of the search shoes.

Each of the four pivot arms 137 for search shoes 104—107 is elongated to project on the other side of an operating arm 153 as at 154. Connected to pivot arm 137 at the portion designated 154 is a counterbalance assembly 155 with removable and replaceable counterweights 156. The counterbalance assembly 155 is connected to pivot arm 137 with appropriate threaded connector assemblies 157. The purpose of the counterbalance assembly 155 will subsequently be described in detail.

A mounting shaft assembly 158 has its opposite ends journaled in bearings 159 mounted in side plates 132 and 133 of shoe support bracket 131. As shown at FIG. 13, shaft assembly 158 includes a first shaft 160 and a second shaft 161. The inner end 162 of shaft 160 has fixed thereto a pin 163 which projects axially from this end. Pin 163 extends through a bearing 164 which mounts inner end 162 of shaft 160 for rotation. Bearing 164 is supported by a bearing support 165 connected to reinforcing bar 135. Pin 163 has a projecting tip which is fixed to a skirt 167 of a cylindrical connector member 168 with a pin 169. End face 170 of connector 168 has formed therein splines 171 which project axially of connector 168 and are best seen with reference to FIG. 12. These splines enter the X-shaped opening 172 of operating arm 153. Shaft 161 is similarly provided with a pin 173 mounted in a bearing 174 which is supported by a bearing support 175 connected to reinforcing bar 135. Pin 173 has a projecting tip 176 fixed to skirt 177 of a connector 178. Connector 178 has an end face 179 with splines 180 formed therein which also enter the X-shaped opening 172 of arm 153. By virtue of this arrangement, it is to be noted that shaft 160 can pivot slightly relative to operating arm 153 of virtue of the clearance between the thickness of each of the splines 171 of connector 168 and the sides 181 of the X-shaped opening in operating arm 153. Similarly, shaft 161 can pivot slightly relative to operating arm 153 by virtue of the similar clearance between splines 180 and sides 181 of the X-shaped opening in operating arm 153. Because of this slight clearance the shafts 160 and 161 can also pivot slightly relative to each other. Hence, the arrangement of splines 171 and 180 within X-shaped opening 172 of operating arm 153 forms a lost motion connection between each of the shafts 160 and 161 and operating arm 153 as well as between the shafts themselves.

Pivot arm 137 of shoe 107 is fixed to shaft 160 and pivot arm 137 of shoe 106 is fixed to shaft 161. Hence, when operating arm 153 is pivoted both shafts are driven by arm 153 to simultaneously pivot shoes 106 and 107. However, because of the lost motion at the connection between operating arm 153 and each of shafts 160 and 161, each of shoes 106 and 107 can move slightly independently of each other about the axis of shaft assembly 158.

FIGS. 11 and 12 show shoes 106 and 107 in their extended or operating position wherein the inspecting face 182 of the shoes engages the surface of a pipe being tested by the inspection apparatus. The shoes are moved to a retracted position in which they are spaced from the surface of a pipe passing through the inspection apparatus by a motor in the form of a pneumatic cylinder 183. Cylinder 183 is fixed to plate 134 of support bracket 131 and operates shoes 106 and 107 between their extended and retracted positions. As shown at FIG. 7, a motor in the form of a pneumatic cylinder 184 is mounted on plate 134 of shoe support bracket 130 to move shoes 104 and 105 between their extended and retracted positions.

Cylinder 183 is of the double acting type and has a shaft 185 extending axially therefrom. Fixed to shaft 185 is an axially extending threaded connector 186 which is threadably connected to a connector member 187. Connector member 187 has a transversely extending pin 188 which extends through an elongated slot 189 at end 190 of operating arm 153 remote from opening 172. Mounted between a collar 191 which encircles a threaded end 192 of pneumatic cylinder 183 and a collar 193 which encircles the threaded portion of connector 186 is a helically wound compression spring 194. The purpose of spring 194, as will subsequently be described in further detail, is to automatically return shoes 106 and 107 to their retracted positions in the event of failure of the pressure system which supplies compressed air to pneumatic cylinder 183.

A threaded stud 195 is connected at the transverse center of head 138 of each pivot arm assembly 136. To provide this connection head 138 has a U-shaped slot 196 to receive the flattened end 197 of stud 195. The connection is effected by a pin 198 which permits pivotal motion between stud 195 and head 138. Stud 195 is elongated and has a nut 199 threaded onto the end of the stud which extends through an opening in plate 134 of the shoe support bracket. Mounted on the stud and in engagement with plate 134 is a washer 200 which provides a seat for one end of a compression spring 201. The other end of spring 201 seats on a washer 202 supported by a locknut arrangement 203 which is threaded onto stud 195 adjacent its flattened end 197. Locknut arrangement 203 provides for adjusting the compression of spring 201. Nut 199 provides a stop to limit the pivotal movement of arm assembly 136 and hence, shoes 106 and 107 in a clockwise direction as viewed at FIG. 12. observe that the spring 201 of shoe 107 urges shoe 107 in a clockwise direction to utilize the play at the lost motion connection between connector member 168 and operating arm 153. Similarly, shoe 106 is urged in a clockwise direction by its spring 201. Hence, the springs 201 provide resilient mounting for each of shoes 106 and 107 to resiliently urge the shoes against the surface of a pipe under test independently of each other to maintain surface 182 of the shoes in engagement with the surface of a pipe under test.

It is to be noted that spring 194 is of sufficient strength to overcome the bias of both springs 201 of shoes 106 and 107, respectively, to automatically return the shoes to their retracted position in the event of failure of pressure of the system which supplies pressurized air to operate cylinder 183.

With reference to FIGS. 2 and 7, it is to be noted that shoe assembly support bracket 130 which supports search shoes 104 and 105 is identical to shoe assembly support bracket 131, just described, which supports search shoes 106 and 107. At FIG. 7, it is shown that shoes 104 and 105 are aligned longitudinally and that shoes 106 and 107 are also aligned. Although shoes 104 and 105 lie in the same plane, which passes through the axis of the rotor assembly 2, as shoes 106 and 107, shoe 104 is not precisely diametrically opposed to shoe 106 nor is shoe 105 precisely diametrically opposed to shoe 107 (FIG. 2). Instead, shoes 106 and 107 are each slightly offset in an axial direction toward outlet end 6 of inspection apparatus 1. By virtue of this arrangement, shoe 106 scans a path around a pipe under test which is between the paths scanned by shoes 104 and 105. Shoe 107 scans a path around the surface of a pipe under test which is to the right of shoe 105 as viewed at FIG. 2. Each shoe is of sufficient width that there is an overlap in the surface areas scanned by each shoe to thus avoid the possibility of missing a portion of the surface of the pipe under test. Observe with regard to FIG. 11 that shoe 106 is mounted on shaft 161, via a keyed connection which includes a key which engages a key slot 205 of shaft 161. Similarly, shoe 107 is mounted on shaft 160 against rotation, by a keyed connection which includes a key slot 206 of shaft 160. These keyed connections mount shoes 106 and 107 for adjustment axially relative to the respective shafts on which the shoes are mounted. Shoes 104 and 105 similarly have their pivot arm assemblies keyed to their shafts 160 and 161 so that shoes 104 and 105 can be adjusted axially of their mounting shafts.

As shown at FIGS. 2, 2-A, and 7, the shoe support assemblies 130 and 131 are mounted within housing 84 of rotor assembly 2 by connecting the respective sides 132 and 133 of each shoe assembly support bracket to end plates 86 and 87, respectively, of the rotor housing. The connection is effected by bolts 207 which extend through suitable openings in the side plates and are threadedly received in end plates 86 and 87. To provide for mounting shoe assemblies 130 and 131 at different distances from the axis of the rotor, each of side plates 132 and 133 is provided with a plurality of openings such as openings 208 to mount the shoe assemblies at different distances from the rotor by passing bolts through the proper ones of holes 208.

Figure 14:
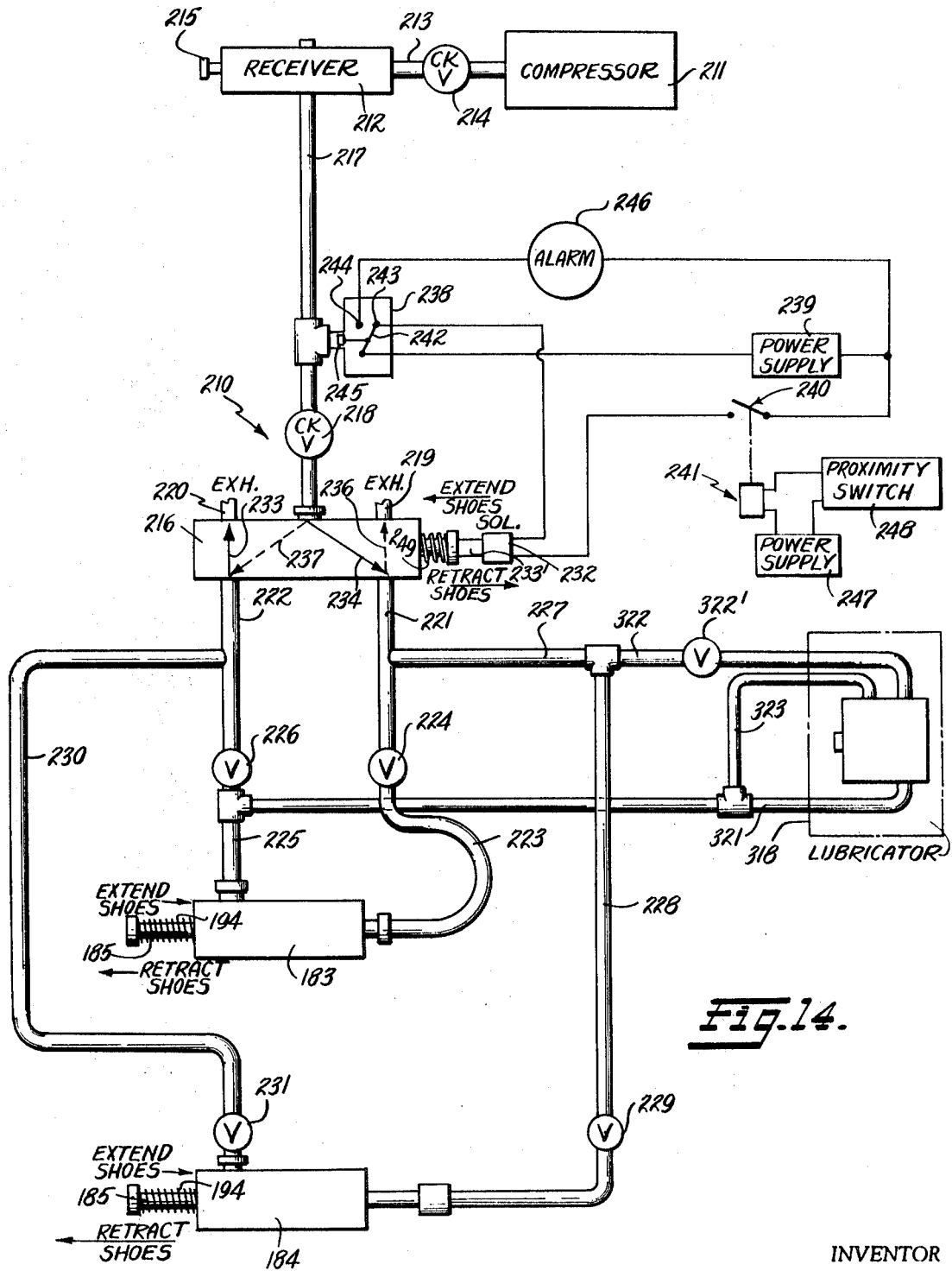
FIG. 14 is a schematic drawing of the pneumatic and significant electric circuitry for the inspection apparatus of one embodiment of the invention.

Referring now to FIG. 14, there is shown the pneumatic system for supplying air under pressure to cylinders 183 and 184, and the associated electrical circuitry to control this pneumatic system. Pneumatic system 210 includes an air compressor 211 which supplies compressed air to a receiver or tank 212 via line 213 and check valve 214. Receiver 212 is provided with a relief valve 215 to prevent excess pressure in the receiver. Air from receiver 212 is conducted to a four-way valve 216 via a line 217 having a check valve 218. Connected to valve 218 are exhaust lines 219 and 220, and flow lines 221 and 222. Flow line 221 is connected to the head end of cylinder 183 by flow line 223 provided with a flow control valve 224 which is adjustable to regulate the air flow to the cylinder and thus regulate the speed at which shaft 185 of the cylinder moves to move the shoes to a retracted position. Flow line 222 is connected to the shaft end of cylinder 183 by a flow line 225 provided with a control valve 226 which is adjustable to regulate the speed at which the shoes are moved to their extended position. Flow line 221 is also connected to the head end of cylinder 184 by flow lines 227 and 228, flow line 228 having a control valve 229 which is the same as control valve 224. Flow line 222 is also connected to the shaft end of cylinder 184 by flow line 230 provided with control valve 231 which is identical to control valve 226.

Four-way valve 216 is operated by solenoid 232. With solenoid 232 unenergized, flow line 221 is connected to flow line 217 as shown by arrow 234 and pressure is applied to the head end of each of cylinders 183 and 184. In addition, exhaust line 220 is connected to flow line 222 as shown by arrow 233 so that the shaft end of each of cylinders 183 and 184 is connected to exhaust line 220. Thus, shafts 183 of each of cylinders 183 and 184 are in their outermost positions in which the search shoes of both shoe support assemblies 130 and 131 are retracted.

When solenoid 232 is energized, operating rod 233' moves to the left as viewed at FIG. 14 to operate four-way valve 216 to its second position. In the second position, flow line 221 is connected to exhaust line 219, as shown by the dotted arrow 236 and flow line 217 is connected to flow line 222 as shown by dotted arrow 237. Pressurized air is thus supplied to the shaft ends of cylinders 183 and 184 and simultaneously the head ends of the cylinders are connected to exhaust line 219. This causes each of shafts 185 to move to its innermost position to correspondingly move each of the search shoes to its extended position.

Solenoid 232 is connected in series with a pressure switch 238, a power supply 239 and a switch 240 of a relay 241. Pressure switch 238 has a movable contact 242 and stationary contacts 243 and 244, movable contract 242 being operated in response to pressure in line 217 acting on piston 245 of pressure switch 238. Movable contact 242 remains in the position shown, in engagement with stationary contact 243, so long as the pressure in flow line 217 is above a predetermined value. However, if there is a drop in pressure in line 217 below the predetermined value, movable contact 242 switches to disconnect solenoid 232 from its power source, and to connect the power source to alarm 246. During normal operation of the inspection apparatus, contact 242 engages stationary contact 243 to connect solenoid 232 to power supply 239 so that the solenoid is energized when switch 240 is closed.

The winding of relay 241 is connected in series with a power supply 247 and a proximity switch 248. Hence, when the proximity switch 248 is closed, the winding of relay 241 is energized to close switch 240. If pressure above a predetermined value is present in flow line 217, solenoid 232 is deenergized so that return spring 249 moves valve 216 to the position of arrows 233 and 234 in which cylinders 183 and 184 move the shoes to their retracted position. In this position of valve 216, the shaft end of each cylinder is connected to exhaust line 220. Hence, even if there is insufficient pressure from line 217 to move shafts 185 of cylinders 183 and 184 to their outermost positions in which the shoes are retracted, such movement is accomplished by the action of springs 194 since the pressure at the shaft ends of the cylinders exhausts to atmosphere. Although the shoes are not retracted as rapidly under the action of springs 194, as they are when proper pressure is applied to the head ends of cylinders 183 and 184, the speed of retraction is sufficient to avoid damage by the uneven and rough ends of the billet pipe.

In the event of failure of either power supplies 247 or 239, solenoid 232 is immediately deenergized and the shoes are returned to their retracted position in the manner previously described. Power supplies 239 and 247 are each located externally of the inspection apparatus and the current from these power supplies is conducted to the rotor assembly via suitable sliprings such as sliprings 250 and 251 (FIG. 2-A).

As shown at FIGS. 2-A, 4, and 5, air compressor 211 is provided with a mounting bracket 255 which is secured to end plate 86 of rotor housing 84 and support plate 76 of the rotor by screws 256 so that the compressor is between these plates and has its rotation parallel with the axis of rotation of rotor assembly 2. Since plate 86 and plate 76 each rotate, during rotation of rotor assembly 2, air compressor 211 revolves about axis 4 of the rotor when the inspection apparatus is in use. Air compressor 211 has a pulley assembly 258 with sheaves 259—261 each of different diameter, the pulley assembly 258 being keyed to drive shaft 262 of the compressor.

Figure 6:
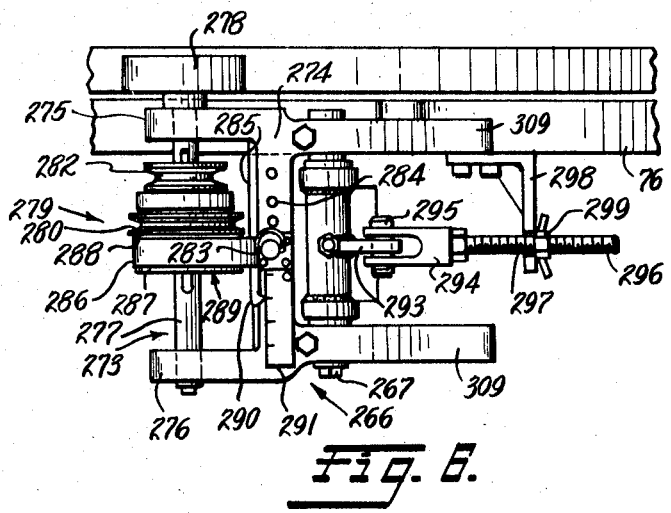
FIG. 6 is a partial view taken along lines 6-6 of FIG. 4.
Figure 5:
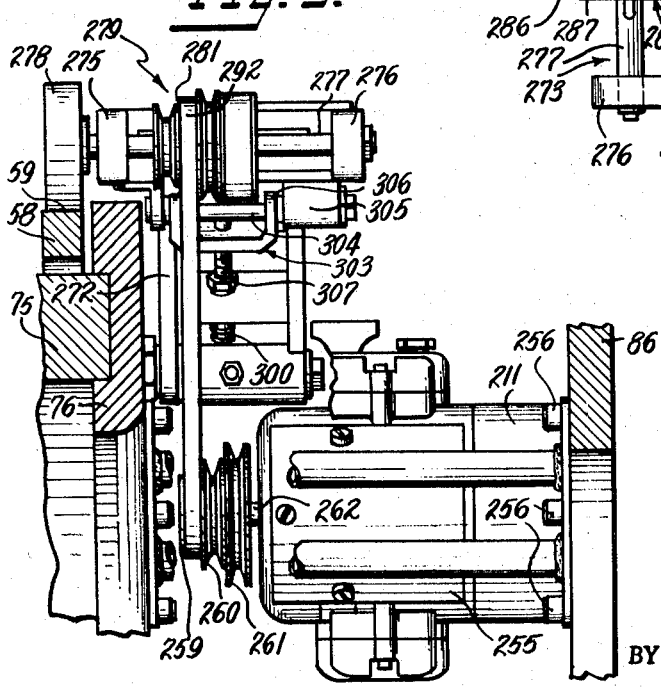
FIG. 5 is a partial sectional view taken along lines 5-5 of FIG. 4.

Compressor 211 is driven by a variable speed belt drive arrangement 265 which provides a variable speed transmission to drive compressor 211. Variable speed belt drive 265 is mounted on support plate 76 of the rotor assembly. The belt drive includes a carriage 266 mounted for pivotal movement about a shaft 267. Shaft 267 is journaled in the sleeve portion 268 of a frame 269 which is mounted for pivotal movement about a stud 270 passing through a sleeve 271 spaced from and fixed to sleeve 268 by parallel connector arms 272. Hence, carriage 266 pivots about the axis of stud 270 as well as about the axis of shaft 267. As best seen in FIG. 6, at one side of shaft 267, carriage 266 has a U-shaped yoke 273 with a body portion 274 and parallel legs 275 and 276. Bearings are provided in legs 275 and 276 to mount a drive shaft 277 for rotation relative to the carriage. Fixed to the end of shaft 277 which projects through leg 275, is a drive wheel 278. Keyed to the portion of shaft 277 between arms 275 and 276 and slidably adjustable thereon is a pulley assembly 279 comprised of sheaves 280—282 of different diameters. The pulley assembly is maintained in the axial position to which it is adjusted by spring biased lockpin 283 which extends through body 274. The lockpin engages in openings 284 of the plate portion 285 of pulley slide retaining device 286. Retaining device 286 engages between the facing edges of flanges 287 and 288 of the journaled portion of a thrust bearing 289. Thus, when the retaining device is indexed to the desired position, lockpin 283 locks pulley assembly 279 against axial movement relative to shaft 277. Retaining device 286 includes an indicator arm 290 and indicia plate 291 mounted on body 274 to facilitate adjustment of the position of the pulley assembly. Thus, with reference to FIG. 5, it is apparent that pulley assembly 279 can be adjusted to one of four different positions to drive compressor 211 at different speeds depending on the one of sheaves 280—282 and the one of sheaves 259—261 of the compressor around which belt 292 is placed.

Fixed to sleeve 268 of frame 269 at the transverse center thereof is an arm 293 which projects from the sleeve in a direction opposite to legs 275 and 276 relative to shaft 267. Arm 293 is connected to a clevis 294 by a pin 295. Clevis 294 is threaded onto the end of said stud 296 which extends through a slot 297 of a bracket 298 fixed to plate 76 and having an axially extending leg in which slot 297 is formed. Threaded onto stud 296 at the end opposite clevis 294 is a wingnut 299 which bears against the surface of bracket 298 which faces away from clevis 294. Stud 296 and wingnut 299 provide for adjusting the tension of belt 292 as will subsequently be described in detail.

Figure 4:
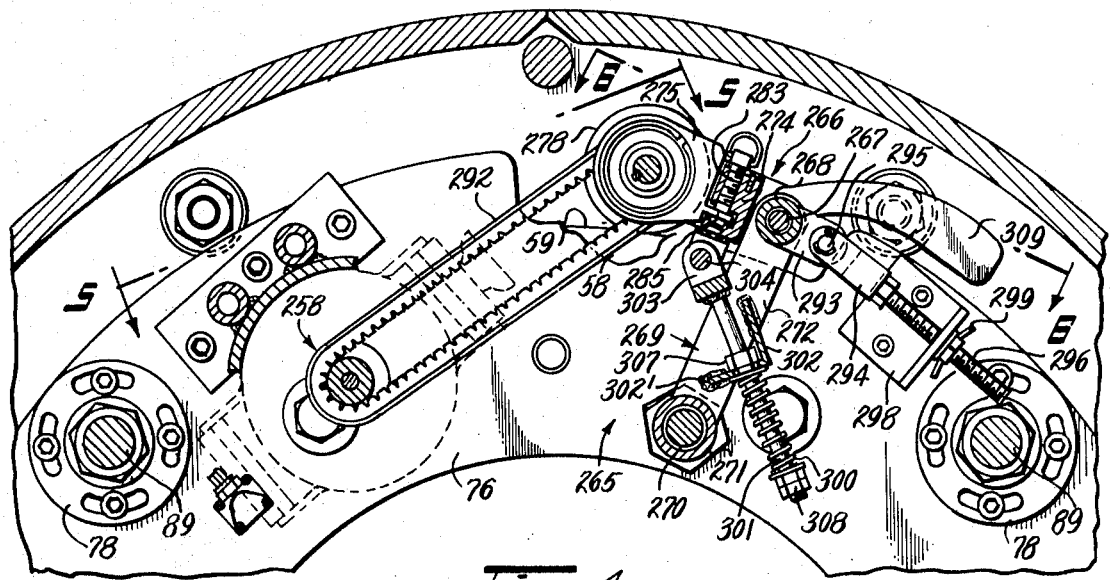
FIG. 4 is a partial sectional view on an enlarged scale taken along lines 4-4 of FIG. 2-A.

Friction wheel 278 has a peripheral face of rubber or some other material with a high coefficient of friction relative to steel. Observe from FIGS. 4—6 that friction wheel 278 engages steel rim 59 of drive ring 58. Since drive ring 58 is fixed, rim 59 drives friction wheel 278 as plate 76 rotates relative to the drive ring during rotation of rotor assembly 2. Friction wheel 278 is maintained in driving engagement with rim 59 of drive ring 58 by three different forces. The first is the force due to the pull exerted by stud 296 when wingnut 299 is threaded further onto the stud against bracket 298. This pull operates to pivot frame 269 and hence, shaft 267 about the axis of stud 270. Such movement increases the tension in belt 292, and hence, urges wheel 278 in a direction radially inwardly against rim 59. In addition, a second force is created by the action of a helically wound compression spring 300 mounted on a stud 301. The stud 301 extends through a leg 302' of an angle bracket 302 fixed to arms 272 of frame 269. One end of stud 301 is provided with a clevis 303 which is connected to the radially inner side of body portion 274 by a bolt 304 which passes through openings in ears 305 of body 274 and openings in arms 306 of clevis 303. A nut 307 threaded onto stud 301 provides a stop where it engages bracket 302 to limit the pivotal movement of carriage 266 and hence, friction wheel 278 in a counterclockwise direction as viewed at FIG. 4. Spring 300 seats on the radially inwardly facing leg of bracket 302 and on a washer retained by a locknut arrangement 308 at the end of stud 301. Thus the compression of spring 300 may be adjusted by adjusting the locknut arrangement 308. Nut 307 is adjusted to limit the pivotal movement of friction wheel 278 to such an extent that the wheel or the bearings of shaft 277 are not damaged, but permits sufficient pivotal movement of wheel 278 about the axis of shaft 267 to assure that spring 300 when properly adjusted, pulls the friction wheel firmly against the drive rim of drive ring 58.

In addition, there is a third force acting on wheel 278 to urge it into engagement with rim 59. This third force is a result of the counterweights 309 of carriage 266 which project on the opposite side of shaft 267 from wheel 278. The weight and length of counterweights 309 are so selected that at normal operating speed of the rotor, the centrifugal forces created by the counterweights exert a slight counterclockwise movement to urge friction wheel 278 against drive rim 59.

By virtue of the arrangement whereby carriage 266 is mounted for pivotal movement about the axes of both shaft 267 and stud 270 each of which is parallel with the axis of rotation 4 of the rotor, the proper force necessary to maintain friction wheel 278 in good driving engagement with rim 59 of drive ring 58 can be easily created by adjusting nut 307 and the locknut arrangement 308 which controls the compression force of spring 300. In addition, the tension of belt 292 can be adjusted independently of the force acting to urge drive wheel 278 against drive rim 59. This is accomplished by adjusting wingnut 299 so that belt 292 is properly tensioned to drive compressor 211 via pulley assembly 279, and then adjusting nut 307 and locknut arrangement 308 to assure proper pressure on wheel 278.

As shown in FIG. 8, air receiver tank 212 is mounted between end plates 86 and 87 of housing 84 and is secured to these end plates by brackets 315 suitably fixed to the end plates as by welding. Mounted on a bracket 316 secured to receiver 212 is a four-way valve 216 with its solenoid 232. As can be seen with reference to FIGS. 2 and 2-A and FIGS. 3 and 7, receiver 212 is approximately circumferentially aligned with air compressor 211 and flow line 213 in the form of a pipe is seen to extend from compressor 211 to the inlet of receiver 212, flow line 213 extending through a suitable opening in end plate 86. As seen in FIG. 8, a flow line 217 extends from receiver 212 to a four-way valve 216. Observe with reference to FIG. 3, that the piping for the pneumatic system 210, previously described with reference to FIG. 14, is mounted adjacent surface 317 of end plate 86 which faces toward outlet end 6 of the inspection apparatus.

Compressor 211 is of the oil-free type to avoid problems of lubricating the compressor due to the high centrifugal forces created when the rotor rotates at operating speed. Although compressor 211 has graphite lubricated pistons, it is to be appreciated that a bellows-type compressor could be used with equal advantage. Since no lubricant is contained in the air which passes through the various valves of the pneumatic system 210 and which enters operating cylinders 183 and 184, a lubricator 318 (FIG. 9) must be provided to lubricate the moving elements of the valves and cylinders of pneumatic system 210. Lubricator 318 is fixed to the one of connector bars 89 which is approximately diametrically opposite from compressor 211. As shown at FIG. 9, the mounting arrangement includes a pair of U-shaped straps 319 and 320 which extend around the threaded portion of connector bar 89 and are secured to lubricator 318 with suitable screws. As shown at FIG. 14, lubricator 318 is connected to flow line 225 by a flow line 321 and is connected to flow line 221 by a flow line 322. In addition, there is a flow line 323 connected to the lubricator which is also connected to flow line 321.

FIG. 10 shows the details of lubricator 318. Lubricator 318 includes a housing 325 with a cover 326 fixed to the housing to seal a chamber 327 of housing 325. Chamber inlet 328 is connected to the pipe of flow line 323. Housing 325 has a thick wall portion 329 which is counterbored as at 330 and 331 at each of its ends and a small diameter bore 332 connecting the chambers provided by counterbores 330 and 331. Fitted into counterbore 330 is a check valve 333 having a spring urged valve element 334. An inlet opening 335' in cover 326 connects the chamber of counterbore 330 to flow line 332. A sleeve 335 having a bore 336 which communicates with bore 332 is threaded into the chamber formed by counterbore 331. Threaded into sleeve 335 is a nozzle 339 with a small diameter bore 338 that communicates with the inside of sleeve 335 at one end, and is provided with nozzle openings 339 extending transversely to bore 338 at its other end. A metering valve 340 seats in a counterbore 341 with its axis perpendicular to the axis of bore 332. Metering valve 340 has a movable spring urged valve element 342. Communicating with counterbore 341 is a smaller bore 343 and extending from the smaller bore is a metering bore 344, which communicates with bore 332. Metering valve 340 is held in counterbore 341 by a retaining stud 345 which extends through fill openings 346 of a sidewall of body 325 as shown at FIG. 10. Thus, stud 345 also closes fill opening 346 of the chamber 327, and chamber 327 can be filled with oil after stud 345 is removed. Flow line 321 connects to the outer end of sleeve 335 and has its end counterbored to provide a chamber 347.

Lubricator 318 dispenses a very small quantity of oil during each extension and retraction cycle of the search shoes. With reference to FIGS. 10 and 14, the operation of the lubricator will now be described. Assume that the search shoes are in their extended position (FIG. 14) whereupon solenoid 232 is energized and four-way valve 216 assumes the position indicated by dotted arrows 236 and 237. With the valve in this position, receiver pressure is present at flow lines 222 and correspondingly, at flow lines 321 and 323. Hence, the receiver pressure is also present at counterbore 347 and in bores 332 and 343 of the lubricator (FIG. 10). In addition, flow line 322 is at atmospheric pressure since flow line 221 is connected to exhaust port 219 with the valve in this position. Hence, check valve 333 has its valve element 334 closed and metering valve 340 similarly has its movable valve element 342 closed by virtue of the action of the springs of these valve elements as well as the pressure acting on the end faces of the valve elements. Although line pressure is present in chamber 327, because of the connection of line 323 to line 321, the area of valve element 342 which is acted on by the pressure in chamber 327 is smaller than the area of the valve element which is acted on by the pressure at bore 343 and hence, valve element 342 remains closed under the action of its spring.

Now assume that solenoid 232 is deenergized so valve 216 is moved to the position indicated by arrows 233 and 234 and correspondingly, the shoes are retracted. In this position of this valve, receiver pressure exists in flow lines 221 and 322 whereas lines 321 and 323 are each connected to exhaust via flow line 227. Hence, a very small amount of air flows from lines 322 to line 321 via valve 333, bore 332, bore 336, bore 338 and nozzles 339. If necessary, such air flow can be regulated by adjusting control valve 322'. When solenoid 232 is again energized, valve 216 again returns to the position of arrows 236 and 237. Thus, line 322 is again connected to exhaust and lines 321 and 323 have receiver pressure therein. As the position of valve 216 changes, chamber 327 of lubricator 318 is immediately provided with receiver pressure. However, because of the very small diameter of nozzles 339 and bore 338, a very slight pressure drop occurs at bore 343. The higher pressure in chamber 327 at that instant then momentarily opens valve 340 so that a very slight amount of oil is dispensed into bore 343. The instant valve 340 opens, the pressures on both sides of valve element 342 become equalized so that the valve element is again closed by the action of its return spring. During the next change of position of valve 216 to again retract the search shoes there is a slight flow of air from line 322 to line 321 as previously described. This air carries with it the minute quantity of lubricant dispensed to bore 343 which finds its way into bore 332, via bore 344 and is atomized as it passes through nozzles 339. During successive extension and retraction cycles, the lubricant travels as a mist or vapor along flow line 321 until it reaches flow line 225. There, part of the oil is carried into the shaft end of cylinder 183, when receiver pressure is present in line 225. When the valve 216 shifts and flow line 225 is connected to exhaust, the oil is carried through valve 216 and into flow line 222. When the valve again shifts to extend the shoes, the small film of oil that remains within pipe 222 and valve 216 is carried as vapor or mist through line 230 to lubricate the shaft end of cylinder 184. Since some of the oil vapor or film is also trapped in the passages of valve 216, eventually the oil finds its way into flow line 221 whereupon the head ends of each of the cylinders 183 and 184 as well as all the associated valves are provided with a minute quantity of lubricant sufficient to insure proper operation of these working elements of the pneumatic system. Since a small quantity of oil is dispensed by lubricator 318 during each extension-retraction cycle of the search shoes, lubricant is always present in all parts of pneumatic system 210, as just described.

OPERATION OF THE INSPECTION APPARATUS

Before placing inspection apparatus 1 in operation, the inspection apparatus is adjusted to accommodate the diameter of pipe to be tested. Assuming that the diameter of pipe to be tested is 14 inches, guide assembly 13 at outlet end 6 of the inspection apparatus is adjusted so rollers 20 and 32 accommodate a 14 inch pipe as shown at FIG. 1. Guide assembly 42 is similarly adjusted so rollers 45 and 46 properly guide a 14 inch pipe.

With reference to FIG. 7, shoe support bracket 130 is adjusted radially of and secured to plates 86 and 87 so that shoes 104 and 105, when in their extended position, engage the surface of a 14 inch diameter pipe 121, under test. Similarly, shoe support bracket 131 is secured to plates 86 and 87 by bolts 207 so that shoes 106 and 107 just engage the surface of pipe 121 when the shoes are in their extended position. Pole pieces 113 and 118 of electromagnets 108 and 109 respectively, are selected of such length as to provide a small gap between the periphery of pipe 121 and the curved faces of the pole pieces. These pole pieces are secured to their respective electromagnets with bolts 114 and 120, respectively.

Pulley assembly 279 (FIG. 5) is adjusted to its appropriate axial position relative to pulley assembly 258 of compressor 211 so that the compressor is driven at a speed sufficient to provide operating pressure in receiver 212. Pulley assembly 279 is maintained in this position by lockpin 283, FIG. 6, as previously described. The tension in belt 292 is adjusted by adjusting wingnut 299 and the force of friction drive wheel 278 against rim 59 of drive ring 58 is adjusted by proper manipulation of stop nut 307 and locknut arrangement 308 in the manner previously described. It should be mentioned at this point that the rotor assembly 2 is rotated at a different speed for different diameters of pipe to maintain the velocity of each of search shoes 104—107 essential constant regardless of the diameter of pipe being tested. Such constant velocity of the search shoes is significant to obtain uniform test data for pipe of uniform diameter and to assure consistent operation of external apparatus to reject defective pipe. Hence, motor 100 will be adjusted to rotate rotor assembly 2 at a higher speed for a 10 inch diameter pipe than for a 14 inch diameter pipe so that the speed of shoes 104—107 relative to the surface of the pipe under test is essentially constant regardless of the diameter of the pipe being tested. Hence, when a large diameter pipe is tested and rotor assembly 2 rotates at a relatively low speed, pulley assembly 279 is adjusted to a position where a relatively large size pulley 281 drives the smallest pulley 259 of compressor 211. This causes the compressor to rotate at a relatively high speed even though rotor assembly 2 and thus drive wheel 278 is rotated at a relatively low speed. However, when a small diameter pipe, for example, an 8 inch diameter pipe is being tested, the rotor will be rotated at a higher speed to maintain surface speed of the search shoes constant, and it is necessary to adjust belt drive 265 so that the compressor rotates at a lower speed relative to the speed of rotation of friction wheel 278. Hence, it is possible to adjust the speed of compressor 211 by virtue of belt drive 265 to be essentially constant regardless of the diameter of pipe under test while maintaining the surface speed of search shoes 104—107 constant.

After these adjustments are made, motor 100 is started to rotate rotor assembly 2 at the predetermined speed for testing of the certain diameter of pipe to be inspected. In the preferred embodiment shown and described the preferred surface speed of shoes 104—107 when extended is at some constant value, perhaps between 450 and 600 feet per minute, although equally good test results are obtained at other selected shoe surface speeds so long as the selected speed is maintained for all diameters of pipe tested.

As shown at FIGS. 15—18, inspection apparatus 1 is particularly adapted for use in a steel mill to test pipe billets immediately after the pipe billets are formed and hence, inspection apparatus 1 is installed in a conveyor line 350 leading from the pipe billet forming station to a next station where additional operations are formed on a pipe billet 351. For purposes of simplicity of explanation, FIGS. 15—18 show the inspection apparatus and conveyor line 350 of the steel mill schematically. The conveyor line 350 of the steel mill includes power driven rollers 352 and 353 which propel pipe billet 351 into inspection apparatus 1 at a constant speed by gripping the pipe billet 351 at the nip between the rollers. The pipe billet then passes between inlet guide rollers 45 and 46 of inspection apparatus 1 which assure that pipe billet 351 is centered relative to the inspection apparatus. The pipe billet passes between search shoes 104—107, through outlet guide rollers 20 and 32 and is then engaged by a second pair of power driven rollers 354 and 355 driven at the same speed as rollers 362 and 353 and which pull pipe billet 351 through the inspection apparatus after the trailing end 357 of the pipe billet passes through driven rollers 352 and 353.

Observe with regard to FIGS. 15 and 17 that both leading end 356 and trailing end 357 of pipe billet 351 are very rough and uneven as a result of the forming operation and that damage to search shoes 104—107 which are very delicate could easily occur if the search shoes are moved to the extended position in engagement with the surface of the pipe at the rough areas adjacent ends 356 and 357. Hence, the extension of shoes 104—107 is controlled to occur after the rough area adjacent leading end 356 of the pipe billet passes beyond the end of shoe 107. In addition, the shoes are retracted immediately prior to the time that the rough or uneven area at trailing end 357 of the pipe billet reaches shoes 104.

The extension and retraction of the shoes is controlled by a proximity sensor 358 mounted on the rotor of the inspection apparatus as shown at FIGS. 2 and 15—18. As shown at FIG. 2, proximity sensor 358 is mounted on end plate 81 of rotor assembly 2. Proximity sensor 358 is connected to proximity switch 248 (FIG. 14). Proximity switch 248 includes a time delay circuit which delays closing of the proximity switch for a predetermined time interval after pipe billet 351 is sensed by proximity sensor 358. Hence, as a pipe billet passes axially into the inspection apparatus, the presence of the pipe is sensed by proximity sensor 358 which provides a continuous signal current to proximity switch 248. Since the pipe billet travels at a constant speed and since the distance between proximity sensor 358 and the outer end edge of shoe 107 is known, it is an easy matter to set the time-delay circuit to permit the rough area at leading end 356 of pipe billet 351 to pass completely beyond search shoe 107 before the search shoes are operated to their extended position by the pneumatic system in response to closing of proximity switch 248 which energizes solenoid 232 (FIG. 14). Since the time delay circuit of proximity switch 248 is of the standard type which provides no time delay when a circuit opens, absence of the signal current from proximity sensor 358 causes proximity switch 248 to open as soon as the trailing end 357 of pipe billet 351 passes the proximity sensor 358. Thus, shoes 104—107 are retracted just before the rough area at trailing end 357 of pipe billet 351 reaches shoe 104. Due to the inertia of pneumatic system 210 which causes a slight time lag between deenergization of solenoid 232 and retraction of the shoes 104—107, proximity sensor 358 is located at a distance from the side of shoe 104 which is slightly greater than the predetermined maximum axial length of the rough area adjacent trailing end 357 of a pipe billet 351.

As successive lengths of pipe are conveyed through the inspection apparatus with their ends spaced apart as shown at FIG. 18 with regard to ends 356 and 357, the shoes are extended to inspect and retracted to avoid damage to the shoes, as just described. Hence, the search shoes are extended to engage the entire smooth surface of each pipe billet as it travels through the inspection apparatus, except for the rough portions adjacent leading end 356 and trailing end 357 of each pipe billet. Since the rough areas at ends 356 and 357 of each pipe billet are subsequently removed by machining, it is apparent that the entire usable length of each pipe billet is inspected by the apparatus. Of course, the apparatus may be used for inspecting finished pipe along its entire length. Since pipe is conveyed through the apparatus at a lineal speed of perhaps 100 to 150 feet per minute (or in some cases much higher speeds, 300 feet per minute or greater) it is also readily apparent that the inspection apparatus provides for rapid inspection of pipe billets as the billets are conveyed at high speed along a conveyor line 350 of a steel mill. When inspecting finished pipe, the feature of retractable shoes is necessary to avoid damage by high speed impact of the pipe ends, rather than to avoid the rough belled ends.

Each time solenoid 232 is energized the search shoes 104—107 are moved to their extended position. Such movement occurs because of the arrangement of the pneumatic system which supplies pressure air to the shaft end of each of cylinders 183 and 184 when the solenoid 232 is energized to the position of arrows 236 and 237 (FIG. 14). As pressure air enters cylinder 183, shoes 106 and 107 are moved simultaneously to the extended position shown at FIGS. 12 and 13 by shaft assembly 158 which is pivoted as operating arm 153 is moved by cylinder 183. However, shoe 106 is urged against the surface of a pipe under test by its spring 201 and shoe 107 is urged against the pipe independently of shoe 106 by its spring 201. As previously described, this action occurs because of the lost motion connection arrangement between shafts 160 and 161 (FIG. 13). In addition, since each of search shoes 106 and 107 is mounted on its own pivot assembly 142 and can also pivot about its mounting pin 144, each shoe precisely follows the surface of a pipe billet under test even though the pipe billet is not exactly aligned with the axis 4 of rotor assembly 2.

Should a power failure occur, or should the pressure in receiver 212 fall below a predetermined value search shoes 104—107 are moved to their retracted positions automatically in the manner previously described.

In a preferred embodiment proximity sensor 358 takes the form of a ferromagnetic material detector. However, a light source and photocell mounted diametrically opposite each other could be used in place of ferromagnetic material detector. With the photocell arrangement, the circuitry would be so arranged that continuous signal current from the photocell is transmitted to the time delay circuit of the proximity switch so long as the light beam from the light source is intercepted by a pipe billet passing through the inspection apparatus.

As a length of pipe billet enters housing 84 of the rotor, the pipe billet is circumferentially magnetized as previously described by electromagnets 108 and 109. Shoes 104—107 circumferentially scan the pipe along overlapping helical paths around the pipe as the rotor rotates. The signal from each of search shoes 104—107 is transmitted to amplifiers 370—373, FIGS. 2 and 3, via suitable wires connected to the search coils of each shoe. The signal from shoe 104 is amplified by amplifier 372 and is mixed with the amplified signal from shoe 105 which is amplified by amplifier 373. Signals from shoes 106 and 107 are amplified by amplifiers 370 and 371 respectively and are also mixed with each other in a suitable mixer. The mixed signals from shoes 104 and 105 are transmitted to one side of the rotating portion 375, shown at the left in FIG. 2, of an induction slipring, and the mixed signals from shoes 106 and 107 are transmitted to the other side of the rotating portion 375 of the inductive slipring, the signal being transmitted via suitable wires (not shown) from the mixer. The signals are then inductively transmitted to stationary inductive sliprings 374 mounted on support 3 and relative to which sliprings 375 rotate. These signals are then transmitted to conventional pipe analyzing equipment, as referred to below with reference to FIG. 37, by suitable connecting wires from terminal 375 of the sliprings.

The inductive slipring arrangement and amplifier may be of the type described at Col. 4, lines 27—50 of U.S. Pat. No. 2,878,447, Price et al., issued Mar. 17, 1959. The analyzing equipment may take the form of an oscilloscope or some device to automatically reject a length of pipe for which a defect signal is received.

Power to operate amplifiers 370—373 is conducted to rotor assembly 2 via sliprings 376, 377, mounted on the rotor assembly which contact brushes 378, 379 mounted on support 3 (FIG. 2-A). Current is conducted to brushes 378, 379 by an external source of power (not shown).

In view of the foregoing description of the inspecting apparatus of one form of this invention, it is apparent that applicant has provided an apparatus for the high speed testing of rough billet pipe as well as other pipe with imperfections and enlargements at its ends without danger of damage to the delicate search shoes used to scan the pipe for imperfections. It is to be understood, however, that other inspection systems may utilize the features of the invention. For example, the search shoes could be extended and retracted by electromagnetic operators in the form of solenoids as will be described in detail, rather than the air cylinders and pneumatic system set forth above. Also, a hydraulic system could be used in place of the pneumatic or electrical systems to power operate the search shoes to their extended and retracted positions.

I claim:

1. Rotary inspection apparatus for inspecting an object to determine a condition of said object comprising
   a rotor adapted to rotate relative to a central axis,
   a movable inspection device mounted on said rotor for rotation therewith about said axis,
   fluid pressure operated means mounted on said rotor and operable on command to move said inspection device from a first position spaced from and out of inspecting relationship to an object on said central axis to a second position on or proximate said object and in inspecting relationship thereto,
   a fluid pressurizing means mounted on said rotor and operable to provide a pressurized fluid while said rotor is rotating,
   means for controllably connecting said fluid pressurizing means to said fluid pressure operated means, and
   command means for controlling said last-named connecting means to cause the fluid pressure operated means to move the inspection device between said first and second positions.

2. Rotary inspection apparatus for inspecting an object to determine a condition of said object comprising
   a rotor adopted to rotate relative to a central axis,
   a movable inspection device mounted on said rotor for rotation therewith about said axis,
   fluid pressure operated means mounted on said rotor and operable on command to move said inspection device from a first position spaced from and out of inspecting relationship to an object on said central axis to a second position on or proximate said object and in inspecting relationship thereto,
   a fluid pressurizing means mounted on said rotor and operable in response to rotation of said rotor to provide a pressurized fluid,
   means for controllably connecting said fluid pressurizing means to said fluid pressure operated means, and
   command means for controlling said last-named connecting means to cause the fluid pressure operated means to move the inspection device between said first and second positions.

3. The inspection apparatus as claimed in claim 2 and further including
   a stationary member located at a position removed from said axis and proximate said rotor,
   means coupling said fluid pressurizing means on the rotor to said stationary member and operable in response to relative motion therebetween to operate said fluid pressurizing means.

4. The inspection apparatus claimed in claim 3 wherein
   said stationary member is a circular member disposed about said axis, and
   said coupling means includes a rotation transmitting member.

5. The combination claimed in claim 4 wherein
   said rotation transmitting member is a wheel which rides on the stationary circular member and is rotated when the rotor rotates about said axis.

6. The inspection apparatus claimed in claim 5 including
   means for moving said object along said axis.

7. The inspection apparatus claimed in claim 6 wherein
   said command means includes means for sensing the approaching and the leaving of an object relative to said movable inspection device for producing command signals to move the inspection device to its second position when said object is in a position to be inspected.

8. Inspection apparatus in accordance with claim 5 in which said coupling means connecting said wheel to said fluid pressuring means is a variable speed transmission.

9. Inspection apparatus in accordance with claim 5 in which said wheel in engagement with said circular member has a smooth peripheral surface engaging said circular member; and which further includes
   means mounting said wheel for pivotal movement about an axis parallel to the axis of rotation of said wheel; and
   means to increase the pressure of engagement of said wheel with said circular member in response to centrifugal forces created by rotation of said rotor.